US012580286B2

(12) United States Patent
Xie et al.

(10) Patent No.: US 12,580,286 B2
(45) Date of Patent: Mar. 17, 2026

(54) BUTTON CELL AND MANUFACTURING METHOD THEREOF AND ELECTRONIC EQUIPMENT

(71) Applicant: Zhuhai CosMX Battery Co., Ltd., Zhuhai (CN)

(72) Inventors: Bin Xie, Zhuhai (CN); Ning Peng, Zhuhai (CN); Longyun Chen, Zhuhai (CN); Yuxiang Zeng, Zhuhai (CN); Zhida Wei, Zhuhai (CN); Yongwang Wang, Zhuhai (CN); Zhifeng Wang, Zhuhai (CN); Desheng Xu, Zhuhai (CN); Hongkai Lin, Zhuhai (CN)

(73) Assignee: Zhuhai CosMX Battery Co., Ltd, Zhuhai (CN)

(*) Notice: Subject to any disclaimer, the term of this patent is extended or adjusted under 35 U.S.C. 154(b) by 592 days.

(21) Appl. No.: 18/061,402

(22) Filed: Dec. 2, 2022

(65) Prior Publication Data

US 2023/0106855 A1     Apr. 6, 2023

Related U.S. Application Data

(63) Continuation of application No. PCT/CN2021/098182, filed on Jun. 3, 2021.

(30) Foreign Application Priority Data

| | | |
|---|---|---|
| Jun. 3, 2020 | (CN) ......................... | 202010496417.7 |
| Apr. 13, 2021 | (CN) ......................... | 202110394741.2 |

(51) Int. Cl.
| | |
|---|---|
| *H01M 50/636* | (2021.01) |
| *H01M 50/109* | (2021.01) |
| *H01M 50/169* | (2021.01) |
| *H01M 50/184* | (2021.01) |
| *H01M 50/536* | (2021.01) |
| *H01M 50/538* | (2021.01) |
| *H01M 50/566* | (2021.01) |
| *H01M 50/627* | (2021.01) |

(52) U.S. Cl.
CPC ....... *H01M 50/636* (2021.01); *H01M 50/109* (2021.01); *H01M 50/169* (2021.01); *H01M 50/184* (2021.01); *H01M 50/536* (2021.01); *H01M 50/538* (2021.01); *H01M 50/566* (2021.01); *H01M 50/627* (2021.01)

(58) Field of Classification Search
CPC ............. H01M 50/627; H01M 50/169; H01M 50/566; H01M 50/184
See application file for complete search history.

(56) References Cited

U.S. PATENT DOCUMENTS

| | | | |
|---|---|---|---|
| 7,341,802 B1 | 3/2008 | Ota et al. | |
| 7,341,805 B2 | 3/2008 | Atsushi et al. | |
| 9,564,654 B2 * | 2/2017 | Wang ................ | H01M 10/0431 |
| 10,224,519 B2 * | 3/2019 | Kawada .............. | H01M 50/169 |
| 11,862,806 B2 | 1/2024 | Peng et al. | |
| 2002/0142216 A1 | 10/2002 | Skoumpris | |
| 2003/0211388 A1 | 11/2003 | Ruth et al. | |
| 2006/0099502 A1 | 5/2006 | Kim et al. | |
| 2007/0117011 A1 | 5/2007 | Myerberg et al. | |
| 2014/0050948 A1 | 2/2014 | Hashimoto et al. | |
| 2015/0047180 A1 | 2/2015 | Schmidt et al. | |
| 2017/0170450 A1 | 6/2017 | Guen | |
| 2017/0187027 A1 * | 6/2017 | Ono .................... | H01M 50/636 |
| 2017/0207491 A1 | 7/2017 | Tamachi et al. | |
| 2018/0145289 A1 | 5/2018 | Yu et al. | |
| 2021/0242438 A1 | 8/2021 | Lee et al. | |
| 2021/0408626 A1 | 12/2021 | Ko et al. | |
| 2024/0088494 A1 | 3/2024 | Peng et al. | |
| 2024/0120586 A1 | 4/2024 | Peng et al. | |

FOREIGN PATENT DOCUMENTS

| | | |
|---|---|---|
| CN | 1134042 A | 10/1996 |
| CN | 1618140 A | 5/2005 |
| CN | 2833898 Y | 11/2006 |
| CN | 101305481 A | 11/2008 |
| CN | 201436694 U | 4/2010 |
| CN | 204596910 | 8/2015 |
| CN | 106159350 A | 11/2016 |

(Continued)

OTHER PUBLICATIONS

Extended European Search Report dated Jan. 31, 2024 regarding application No. 21818650.0.
Notice of Reasons for Refusal dated Jan. 25, 2024 for Japanese Patent Application No. 2022-574616.
Extended European Search Report dated Jan. 31, 2024 regarding application No. 21818153.5.
Extended European Search Report dated Sep. 15, 2023 regarding application No. 23177520.6.
Extended European Search Report dated Sep. 15, 2023 regarding application No. 23177530.5.
Notice of Allowance dated Aug. 30, 2023 regarding U.S. Appl. No. 17/127,252.
The First Examination Opinion dated Nov. 9, 2024 for Application No. 202110394741.2.
Advisory Action dated Sep. 6, 2022 for U.S. Appl. No. 17/127,252.
Final Office Action dated Jun. 28, 2022 for U.S. Appl. No. 17/127,252.
Non-Final Office Action dated Nov. 28, 2022 for U.S. Appl. No. 17/127,252.

(Continued)

*Primary Examiner* — Jonathan Johnson

(57) ABSTRACT

The present application provides a button cell and its manufacturing method and electronic equipment. The button cell includes a housing, an electrode assembly and a covering member, an accommodating cavity being provided in the housing, the electrode assembly being located in the accommodating cavity, the housing having a liquid injection hole for injecting electrolyte into the accommodating cavity; an outer surface of the housing having a recessed portion that is recessed towards an inner side of the accommodating cavity, the recessed portion being located at a orifice of the liquid injection hole and communicated with the liquid injection hole; and the covering member being welded to the outer side of the housing to cover the recessed portion and the liquid injection hole. The button cell and its manufacturing method and electronic equipment of the present.

19 Claims, 13 Drawing Sheets

(56) References Cited

FOREIGN PATENT DOCUMENTS

| | | | |
|---|---|---|---|
| CN | 106654077 | A | 5/2017 |
| CN | 107068960 | A | 8/2017 |
| CN | 107768586 | A | 3/2018 |
| CN | 207282605 | U | 4/2018 |
| CN | 108023037 | A | 5/2018 |
| CN | 108172700 | A | 6/2018 |
| CN | 207651537 | U | 7/2018 |
| CN | 109192889 | A | 1/2019 |
| CN | 110459705 | A | 11/2019 |
| CN | 110828885 | A | 2/2020 |
| CN | 210224214 | U | 3/2020 |
| CN | 211238301 | U | 8/2020 |
| CN | 111613739 | A | 9/2020 |
| CN | 211404538 | U | 9/2020 |
| CN | 111900275 | A | 11/2020 |
| CN | 212434722 | U | 1/2021 |
| CN | 212434725 | U | 1/2021 |
| CN | 112551242 | A | 3/2021 |
| CN | 214411334 | U | 10/2021 |
| CN | 209804717 | U | 12/2021 |
| EP | 4050708 | A1 | 8/2022 |
| FR | 3034912 | A1 | 10/2016 |
| JP | H0265066 | A | 3/1990 |
| JP | 2000268811 | A | 9/2000 |
| JP | 2011216479 | A | 10/2011 |
| JP | 2014026865 | A | 2/2014 |
| JP | 2015176637 | A | 10/2015 |
| JP | 2019046639 | A | 3/2019 |
| JP | 2019145376 | A | 8/2019 |
| KR | 10-2020-0020173 | A | 2/2020 |
| WO | WO2019013326 | A1 | 1/2019 |
| WO | WO2021185074 | A1 | 9/2021 |
| WO | 2021244272 | A1 | 12/2021 |
| WO | 2021244618 | A1 | 12/2021 |

OTHER PUBLICATIONS

Non-Final Office Action dated Mar. 4, 2022 for U.S. Appl. No. 17/127,252.

Extended European Search Report dated Jun. 17, 2021 for Application No. EP20217378.7.

International Search Report and Written Opinion dated Aug. 26, 2021 for International Application No. PCT/CN2021/098182.

Office Action dated Jan. 26, 2022 for European Application No. 20217378.7.

Office Action dated Jul. 28, 2022 for European Application No. 20217378.7.

Non-Final Office Action dated Aug. 8, 2024 for U.S. Appl. No. 18/512,145.

Non-Final Office Action dated Aug. 8, 2024 for U.S. Appl. No. 18/512,103.

Decision to Grant a Patent dated Jul. 30, 2024 for Japanese Patent Application No. 2022-574616.

The Office Action for Chinese Patent Application No. 202010496417.7, dated May 18, 2023.

* cited by examiner

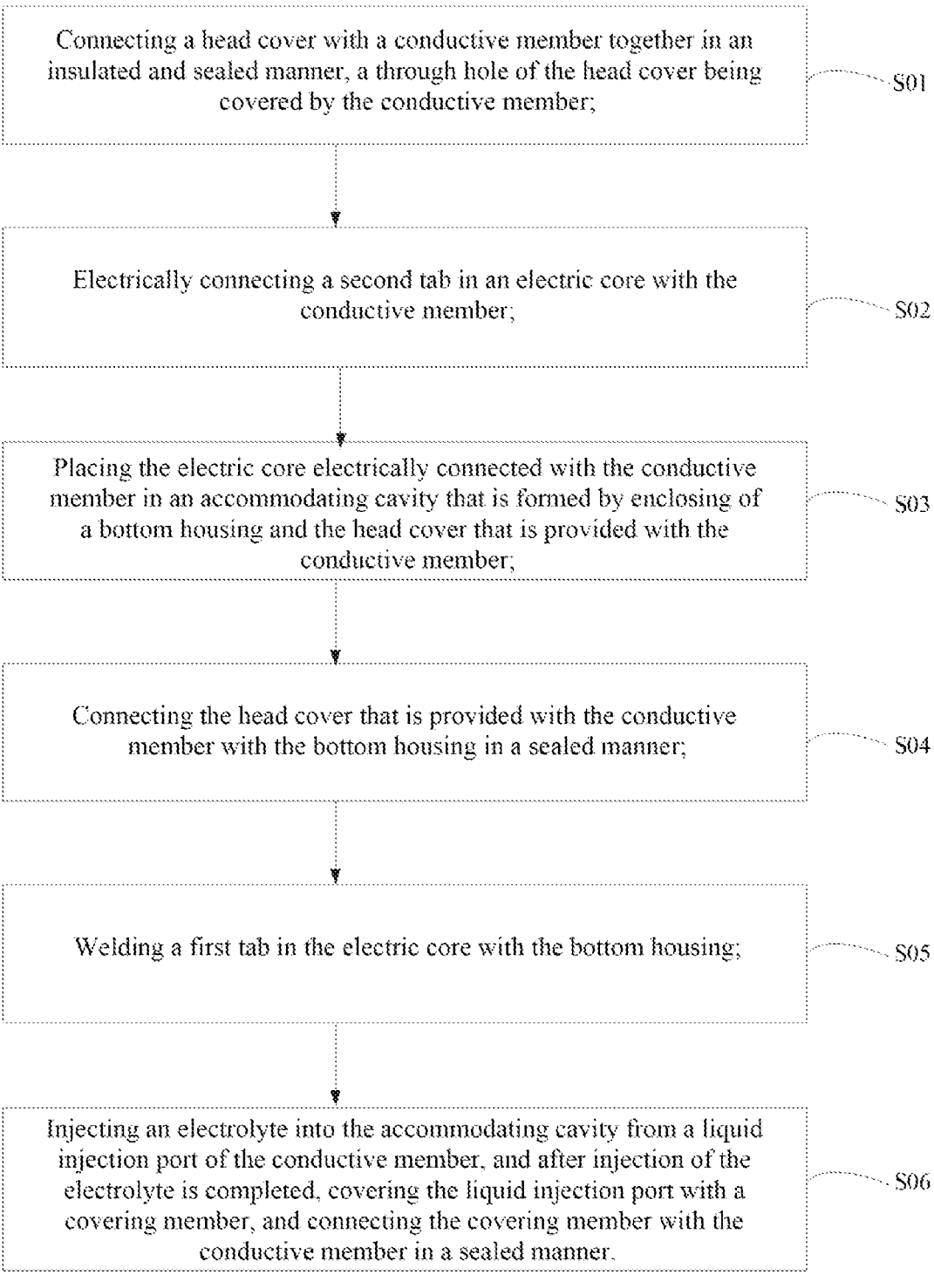

Connecting a head cover with a conductive member together in an insulated and sealed manner, a through hole of the head cover being covered by the conductive member;

S01

Electrically connecting a second tab in an electric core with the conductive member;

S02

Placing the electric core electrically connected with the conductive member in an accommodating cavity that is formed by enclosing of a bottom housing and the head cover that is provided with the conductive member;

S03

Connecting the head cover that is provided with the conductive member with the bottom housing in a sealed manner;

S04

Welding a first tab in the electric core with the bottom housing;

S05

Injecting an electrolyte into the accommodating cavity from a liquid injection port of the conductive member, and after injection of the electrolyte is completed, covering the liquid injection port with a covering member, and connecting the covering member with the conductive member in a sealed manner.

BUTTON CELL AND MANUFACTURING METHOD THEREOF AND ELECTRONIC EQUIPMENT

CROSS-REFERENCE TO RELATED APPLICATIONS

This application is a continuation of International Application No. PCT/CN2021/098182, filed on Jun. 3, 2021, which claims priority to Chinese Patent Application No. 202110394741.2 filed on Apr. 13, 2021, and Chinese Patent Application No. 202010496417.7 filed on Jun. 3, 2020. All of the aforementioned patent applications are hereby incorporated by reference in their entireties.

TECHNICAL FIELD

The present application relates to the technical field of cell, in particular relates to a button cell and manufacturing method thereof and electronic equipment.

BACKGROUND

Button cell refers to a cell with a boundary dimension like a button. Generally speaking, its diameter is larger and its thickness is thinner. Because of its small size, button cell has been widely used in various microelectronic equipment, such as wearable electronic equipment field, medical products field and the like.

Because the interior of the button cell belongs to a closed space, the sealing performance is extremely important for the button cell. However, the sealing performance of the button cell in the prior art is poor, resulting in poor safety and stability of the button cell.

SUMMARY

In view of the above problems, the embodiment of the present application provides a button cell and manufacturing method thereof and electronic equipment, having better safety and stability.

In order to achieve the above purposes, the embodiment of the present application provides the following technical solutions.

A first aspect of the embodiment of the present application provides a button cell, including a housing, an electrode assembly and a covering member. An accommodating cavity is disposed in the housing, the electrode assembly is located in the accommodating cavity, and the housing is provided with a liquid injection hole for injecting electrolyte into the accommodating cavity; an outer surface of the housing is provided with a recessed portion, which is recessed towards an inner side of the accommodating cavity, and the recessed portion is located at an orifice of the liquid injection hole and communicated with the liquid injection hole; the covering member is welded to an outer side of the housing to cover the recessed portion and the liquid injection hole.

A second aspect of the embodiment of the present application provides an electronic equipment, including an electronic equipment body and a button cell in the first aspect, the button cell providing electric energy for the electronic equipment body.

A third aspect of the embodiment of the present application provides a button cell, which includes: a housing, an electric core and a conductive member; the housing includes a bottom housing and a head cover, the head cover and the bottom housing are hermetically connected, an accommodating cavity for holding the electric core is formed by enclosing of the bottom housing and the head cover, the head cover is provided with a through hole communicated with the accommodating cavity, and the conductive member covers the through hole and is connected with the head cover in an insulated and sealed manner through a sealing rubber ring; the conductive member is also provided with a liquid injection port for injecting electrolyte into the accommodating cavity, the liquid injection port is covered with a covering member, the covering member and the liquid injection port are hermetically connected; the electric core has a first tab and a second tab, the first tab is butted to and welded with an inner bottom wall of the bottom housing, and the second tab is electrically connected with the conductive member.

A fourth aspect of the embodiment of the present application provides an electronic equipment, including an electronic equipment body and a button cell provided by the third aspect, the button cell providing electric energy for the electronic equipment body.

A fifth aspect of the embodiment of the present application provides a manufacturing method of a button cell, which includes the following steps: covering a through hole of a head cover with a conductive member and making the head cover and the conductive member connected together in an insulate and sealed manner; placing an electric core in an accommodating cavity of a bottom housing; subjecting a first tab in the electric core to be butted to an inner bottom wall of the bottom housing with a butting piece, so as to make the first tab tightly contact with the inner bottom wall of the bottom housing; welding the first tab to the inner bottom wall of the bottom housing; electrically connecting the second tab in the electric core with a conductive member; removing the butting piece, and injecting an electrolyte into the accommodating cavity from a liquid injection port of the conductive member, and after the injection of electrolyte is completed, covering the liquid injection port with a covering member and connecting the covering member with the conductive member in a sealed manner.

A sixth aspect of the embodiment of the present application provides a manufacturing method of a button cell, which includes the following steps: connecting a head cover with a conductive member together in an insulated and sealed manner, a through hole of the head cover being covered by the conductive member; electrically connecting a second tab in an electric core with the conductive member; placing the electric core electrically connected with the conductive member in an accommodating cavity that is formed by enclosing of a bottom housing and the head cover provided with the conductive member; connecting the head cover provided with the conductive member with the bottom housing in a sealed manner; welding a first tab in the electric core with the bottom housing; injecting an electrolyte into the accommodating cavity from a liquid injection port of the conductive member, and after the injection of electrolyte is completed, covering the liquid injection port with a covering member, and connecting the covering member with the conductive member in a sealed manner.

The button cell provided in the embodiment of the present application has the following advantages.

In the embodiments of the present application, the button cell includes a housing, an electrode assembly and a covering member, an accommodating cavity is disposed in the housing, the electrode assembly is located in the accommodating cavity, and the housing is provided with a liquid injection hole for injecting electrolyte into the accommodating cavity; an outer surface of the housing is provided with a recessed portion, the recessed portion is recessed towards an inner side of the accommodating cavity, and the recessed portion is located at an orifice of the liquid injection hole and communicated with the liquid injection hole; the covering member is welded to the outer side of the housing to cover the recessed portion and the liquid injection hole. In the above solution, since a recessed portion is disposed at the orifice of the liquid injection hole and a mouth of the recessed portion opens towards the outer side of the housing, after the injection of electrolyte is completed, the remaining electrolyte near the orifice of the liquid injection hole will be contained in the recessed portion rather than being attached to the welding area on the outer surface of the housing, so neither the welding operation of the covering member and the housing, nor the sealing of welding will be affected. Therefore, the safety and stability of button cell are better.

In addition to the technical problems solved by the embodiments of the present application, the technical features constituting the technical solutions and the beneficial effects brought by the technical features of these technical solutions described above, other technical problems that can be solved by the button cell and manufacturing method thereof and electronic equipment provided by the embodiments of the present application, other technical features included in the technical solutions, and the beneficial effects brought by these technical features will be further explained in detail in the specific embodiments.

BRIEF DESCRIPTION OF THE DRAWINGS

In order to more clearly explain the technical solutions in the embodiments of the present application or in the prior art, the following will briefly introduce the drawings required to be used in the embodiments or the description of the prior art. It is obvious that the drawings in the following description are some embodiments of the present application. For those skilled in the art, without paying creative labor, other drawings may also be obtained from these drawings.

FIG. 14 is a flowchart of another manufacturing method of the button cell provided in Embodiment 4 of the present application.

DESCRIPTION OF EMBODIMENTS

The existing button cell has the technical problem that when a sealing sheet is welded with a metal housing, poor sealing effect of welding is easy to lead to poor safety and stability of the button cell. This is because when the electrolyte is injected into the metal housing through a liquid injection port, part of the electrolyte will stay near the welding area on the metal housing, thereby affecting the welding operation of the metal housing and the sealing sheet.

The button cell of the present application is provided with a recessed portion at the orifice of the liquid injection hole, as a retention portion for the residual electrolyte, which can effectively prevent the electrolyte from being attached to the welding area on the outer surface of the housing, thereby avoiding affecting the welding of the covering member and the housing.

In order to make the above purposes, features and advantages of the embodiments of the present application more obvious and easy to understand, the technical solutions in the embodiments of the present application will be clearly and completely described below in combination with the accompanying drawings in the embodiments of the present application. Obviously, the described embodiments are only part of the embodiments of the present application, not all of the embodiments. Based on the embodiments in the present application, all other embodiments obtained by those of ordinary skill in the art without paying creative labor belong to the protection scope of the present application.

Embodiment 1

The button cell of the embodiment of the present application is described below in combination with the accompanying drawings.

Figure 1:
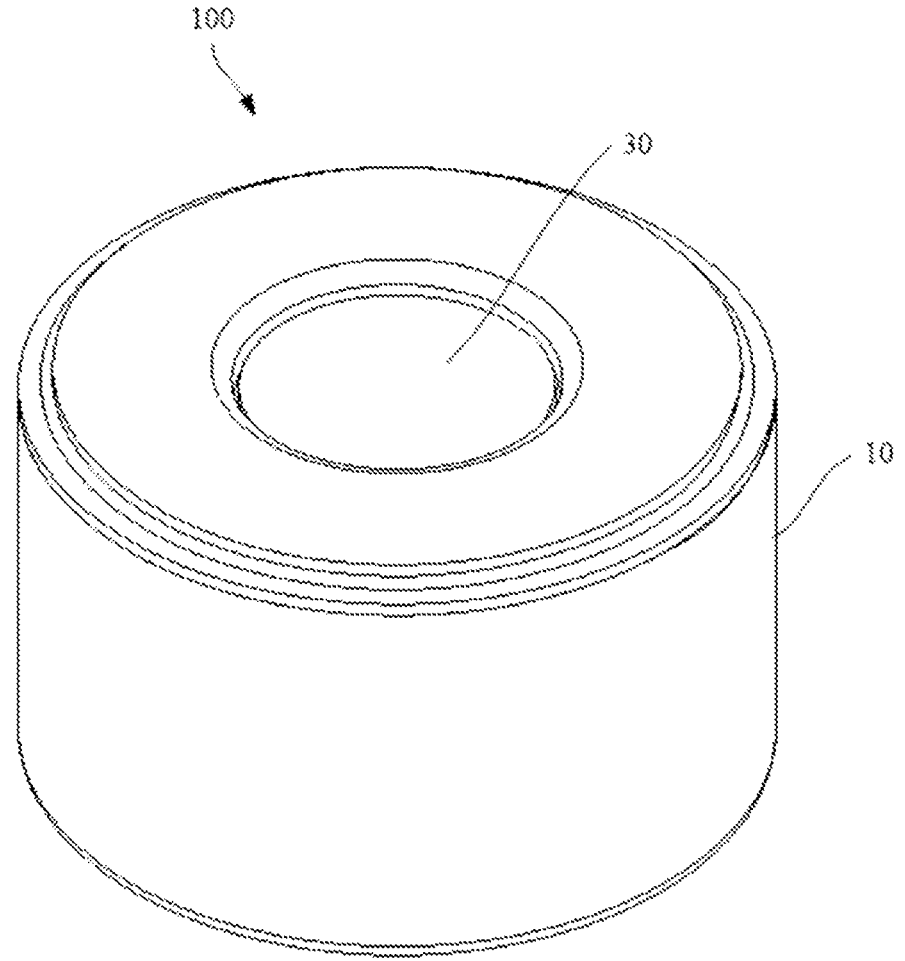
FIG. 1 is a schematic diagram of an overall structure of the button cell provided by the embodiment of the present application.
Figure 2:
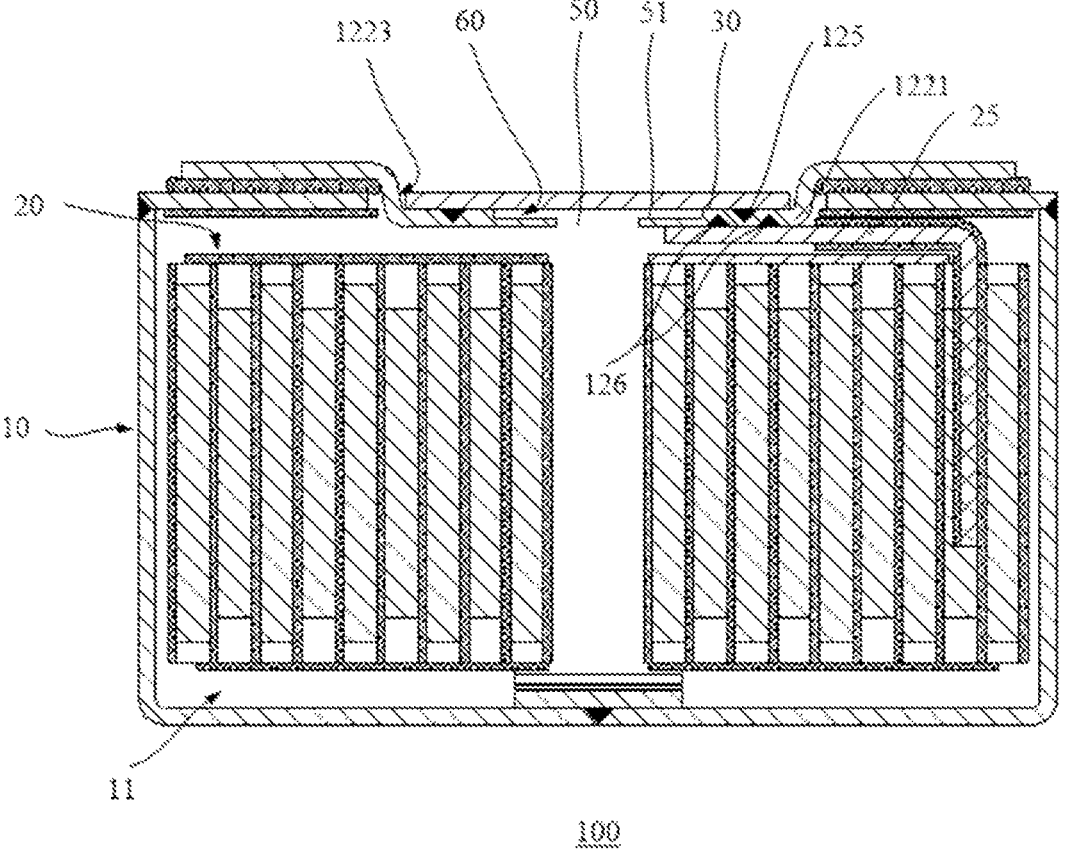
FIG. 2 is a cross-sectional schematic diagram of the button cell provided by the embodiment of the present application, which is cut along a first tab.
Figure 3:
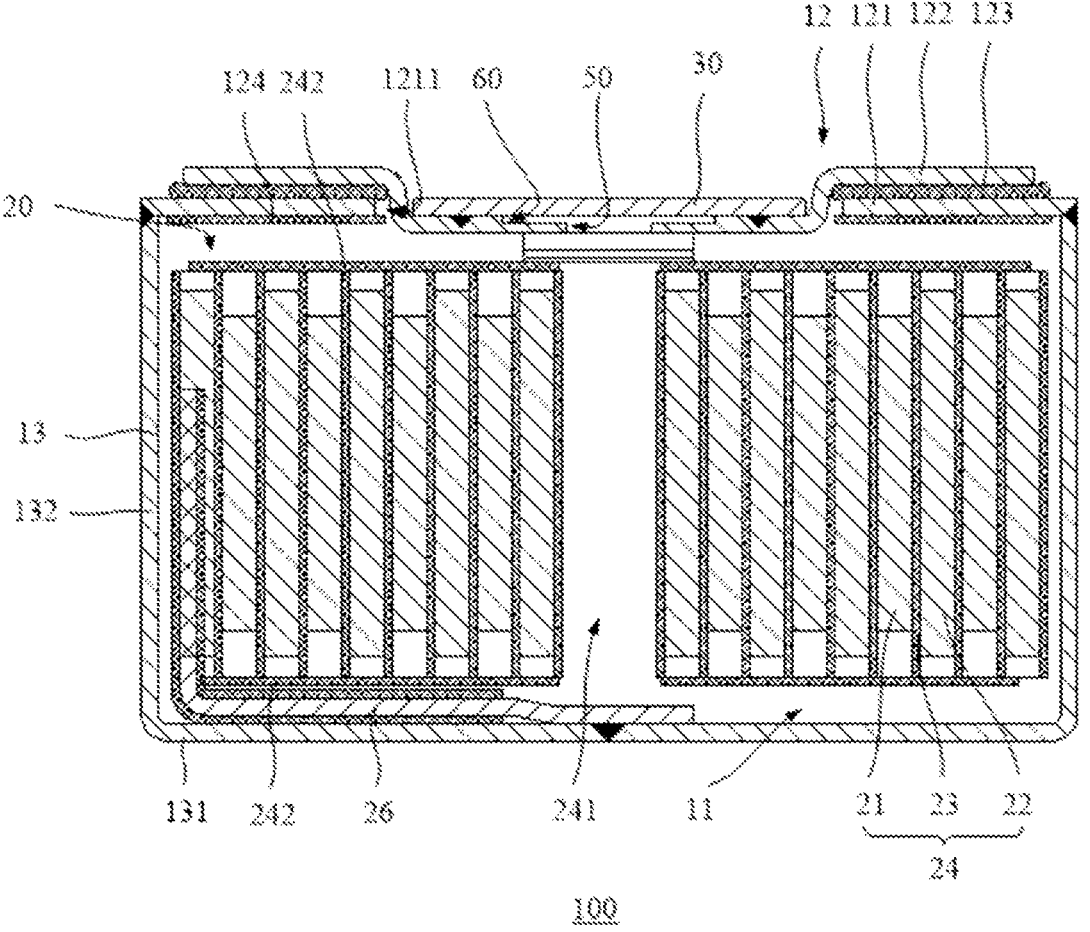
FIG. 3 is a cross-sectional schematic diagram of the button cell provided by the embodiment of the present application, which is cut along a second tab.
Figure 4:
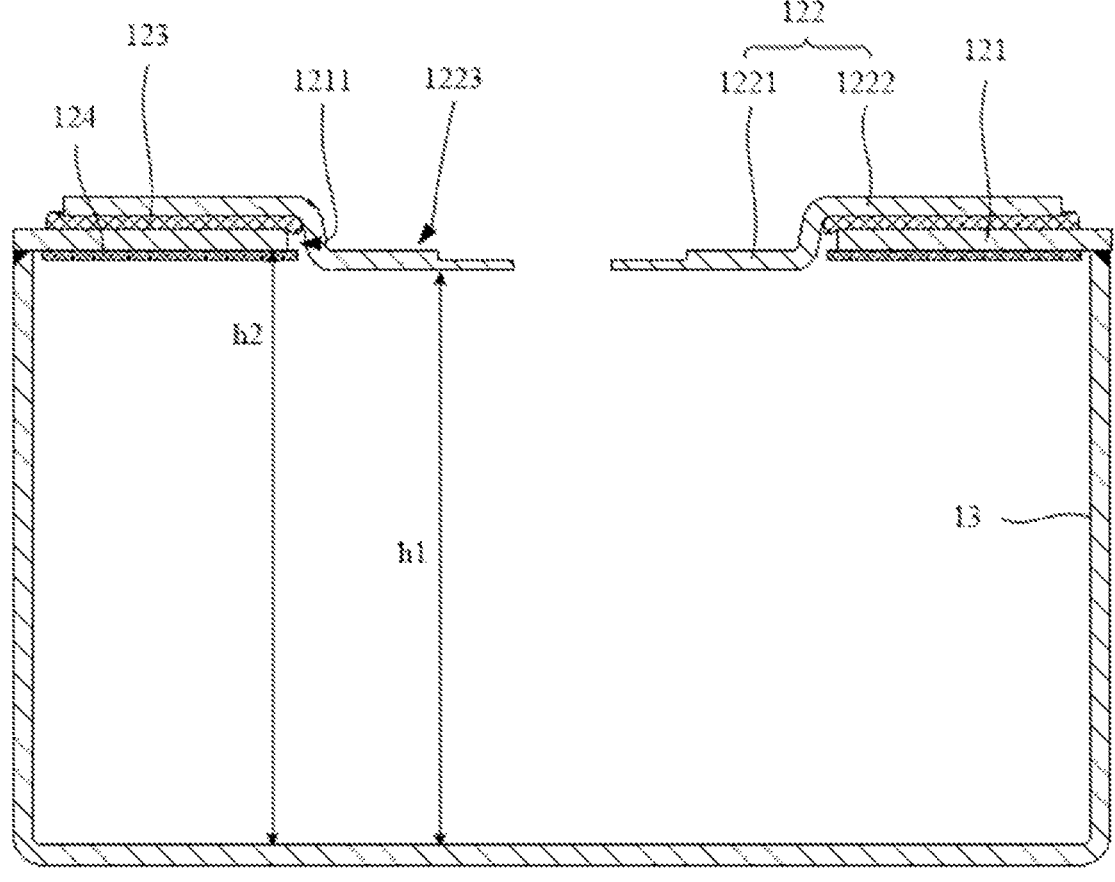
FIG. 4 is a sectional view of a cover plate assembly in the button cell provided by the embodiment of the present application.

FIG. 1 is the overall structural schematic diagram of the button cell provided by the embodiment of the present application, FIG. 2 is the cross-sectional schematic diagram of the button cell provided by the embodiment of the present application, which is cut along a first tab, FIG. 3 is the cross-sectional schematic diagram of the button cell provided by the embodiment of the present application, which is cut along a second tab, and FIG. 4 is the sectional view of a cover plate assembly in the button cell provided by the embodiment of the present application.

Referring to FIG. 1, FIG. 2, FIG. 3 and FIG. 4, in the embodiment of the present application, a button cell 100 includes a housing 10, an electrode assembly 20 and a covering member 30. An accommodating cavity 11 is disposed in the housing 10, the electrode assembly 20 is located in the accommodating cavity 11, and the housing 10 is provided with a liquid injection hole 50 for injecting electrolyte into the accommodating cavity 11; an outer surface of the housing 10 is provided with a recessed portion 60, which is recessed towards the inner side of the accommodation cavity 11, and the recessed portion 60 is located at the orifice 51 of the liquid injection hole 50 and communicated with the liquid injection hole 50; the covering member 30 is welded to the outer side of the housing 10 to cover the recessed portion 60 and the liquid injection hole 50.

In the above embodiment, since the recessed portion 60 is disposed at the orifice 51 of the liquid injection hole 50 and a mouth of the recessed portion 60 opens towards the outer side of the housing 10, after the injection of electrolyte is completed, the remaining electrolyte near the orifice 51 of the liquid injection hole 50 will be contained in the recessed portion 60 rather than being attached to the welding area on the outer surface of the housing 10, so neither the welding operation of the covering member 30 and the housing 10, nor the sealing of welding will be affected. Therefore, the safety and stability of the button cell 100 is better.

In addition, since the recessed portion 60 is arranged at the orifice 51 of the liquid injection hole 50, compared with the structure having only liquid injection hole 50 in the prior art, the welding point between the covering member 30 and the housing 10 is further away from the central axis of the liquid injection hole 50, which is more conducive to the welding operation.

The button cell refers to a cell whose overall dimension looks like a button. Generally, its diameter is larger and its thickness is thinner. Therefore, the button cell is obtained by the classification of the cell from the appearance. In this application, the housing 10 may be a metal housing, and the cross-sectional shape of the housing 10 is not limited to a circle, and may also be ellipse, polygon, etc. The following embodiment is illustrated by taking the button cell 100 being a lithium-ion battery as an example.

In the embodiment of the present application, referring to FIG. 2 and FIG. 3, the electrode assembly 20 may include a winding core 24, a first tab 25 and a second tab 26. The winding core 24 includes a first plate 21, a second plate 22, and a diaphragm 23 for separating the first plate 21 and the second plate 22, etc. Specifically, the winding core 24 may be a cylindrical one and arranged in the accommodating cavity 11. The accommodating cavity 11 also contains electrolyte. The first plate 21 and the second plate 22 are separated by the diaphragm 23 and wound. In addition, a hollow portion 241 may be arranged in the center of the winding core 24. It can be understood that an end-face insulating adhesive 242 may also be arranged at a top end and a bottom end of the winding core 24.

A position of the first plate 21 close to the periphery of winding is electrically connected to the first tab 25, the position of the second plate 22 close to the periphery of winding is electrically connected to the second tab 26. The first tab 25 and the second tab 26 may extend out from both end sides of the winding core 24 respectively, and an included angle between the connecting line between the first tab 25 and the center of the winding core 24 and that between the second tab 26 and the center of the winding core 24 is greater than 0° and less than 180°. For example, the included angle may be between 90° and 180°. The electrolyte may be injected into the housing 10 through the liquid injection hole 50 arranged in the housing 10.

In the above solution, the fact that the recessed portion 60 is recessed towards the inner side of the accommodation cavity 11, means that the depth direction of the recessed portion 60 points from an outer side to an inner side of the accommodation cavity 11. The fact that the recessed portion 60 is located at the orifice 51 of the liquid injection hole 50 and communicated with the liquid injection hole 50, means that the recessed portion 60 is located at the edge of the orifice 51 of the liquid injection hole 50 and opens towards the outer side of the housing 10.

Both the first plate 21 and the second plate 22 may be coated with an active material for battery. The surfaces of the first tab 25 and the second tab 26 may also be attached with protective adhesive respectively.

In the embodiment of the present application, in order to prevent the welding operation in the whole circumferential direction of the liquid injection hole 50 from being affected, the recessed portion 60 may surround the orifice 51 along the circumferential direction of the liquid injection hole 50, so as to make the recessed portion 60 form a counter bore structure, which is also convenient for processing.

Optionally, a diameter of the liquid injection hole 50 may be in a range of 0.2-3 mm, for example, it may be in a range of 0.5-1.5 mm; a diameter of the recessed portion 60, that is, the counter bore structure, may be in a range of 1.5-3.5 mm, for example, it may be in a range of 2-3 mm; and a depth of the recessed portion 60 is in a range of 0.01-0.2 mm, for example, it may be in a range of 0.05-0.1 mm, in which the cross-sectional shape of the recessed portion 60 and the liquid injection hole 50 may be circular or polygonal.

In the embodiment of the present application, referring to FIG. 2 and FIG. 3, in an optional implementation, the housing 10 includes a lower housing 13 and a cover plate assembly 12, and the lower housing 13 and the cover plate assembly 12 may enclose together to form the accommodation cavity 11. As described above, the housing 10 is configured as two detachable parts to facilitate the installation of the electrode assembly 20 and the like into the accommodation cavity 11. Optionally, the lower housing 13 may include a bottom wall 131 and a side wall 132 surrounding the bottom wall 131, and a bottom end of the side wall 132 is connected with the bottom wall 131, so that the lower housing 13 is formed into a hood-like structure with an opening.

In the button cell 100 of the present application, the liquid injection hole 50 may be arranged at the top or bottom of the housing 10 as required, which will be specifically described below.

Referring to FIG. 2 and FIG. 3, in an optional embodiment, the cover plate assembly 12 includes a head cover 121 and a conductive member 122, the head cover 121 is connected to the top of the lower housing 13, the head cover 121 is provided with a through hole 1211, which is covered by the conductive member 122, and the conductive member 122 is connected with the head cover 121 in an insulated manner; the conductive member 122 is provided with a liquid injection hole 50, and the covering member 30 is welded to the conductive member 122 to cover the recessed portion 60 and the liquid injection hole 50. The conductive member 122 may be made of, for example, aluminum or aluminum alloy, and the head cover 121 may be made of metal such as steel or nickel.

Here, the conductive member 122 is connected with the head cover 121 in an insulated manner. For example, an insulating sealant may be disposed between the conductive member 122 and the head cover 121, such as hot-melt PP (polypropylene) adhesive 123. In this way, under the heated state, the conductive member 122 and the head cover 121 are connected through the hot-melt PP adhesive 123, so that the conductive member 122 and the head cover 121 may be connected in an insulated and sealed manner. On the inner wall of the head cover 121 facing the accommodating cavity 11, a housing insulating adhesive 124 may also be attached. The housing insulating adhesive 124 is a non-metallic insulating material, and its thickness may be 0.02-0.1 mm, for example, 0.03-0.05 mm.

Referring to FIG. 2 and FIG. 4, the structural schematic diagrams of the cover plate assembly 12 are shown. Optionally, the conductive member 122 includes a boss portion 1221, the boss portion 1221 is arranged to correspond to the through hole 1211 of the head cover 121 and protrudes beyond an outer side of other parts of the conductive member 122 so as to extend into an interior of the accommodation cavity 11 through the through hole 1211. In addition, the first tab 25 is electrically connected with a bottom end face of the boss portion 1221. In this way, the conductive member 122 is provided with a boss portion 1221, which extends from the through hole 1211 of the head cover 121 into the interior of the accommodating cavity 11 to facilitate electrical connection with the first tab 25. As a possible embodiment, the boss portion 1221 may be formed by stamping, for example, and the outer contour of the boss portion 1221 may be roughly the same as that of the edge of the through hole 1211.

The conductive member 122 may also include an overlap portion 1222 arranged around the boss portion 1221, one end of the overlap portion 1222 being connected with the boss portion 1221 and extending away from the boss portion 1221. When the conductive member 122 is installed, the overlap portion 1222 may be welded to the head cover 121 through hot-melt PP adhesive 123, and the boss portion 1221 extends into the accommodation cavity 11 through the through hole 1211. It should be noted that there is a preset interval between the side of the boss portion 1221 and a hole wall of the through hole, in order to avoid contact between the conductive member 122 and the head cover 121. At this time, the first tab 25 may be in direct contact with the boss portion 1221, that is, the electrical connection between the conductive member 122 and the first tab 25 is realized. The second tab 26 may be directly welded to an inner side wall of the bottom of the housing 10, and the welding point may correspond to the center of the winding core 24.

Here, the first tab 25 and the boss portion 1221 may be welded to each other to form a second weld mark 126. The second weld mark 126 may be located on the side of the conductive member 122 away from the covering member 30. That is, in FIG. 2, the second weld mark 126 is located on a lower surface of the conductive member 122.

The covering member 30 and the conductive member 122 are welded to each other to form a first weld mark 125. The first weld mark 125 may be located on the side of the conductive member 122 facing the covering member 30 That is, in FIG. 2, the first weld mark 125 is located on an upper surface of the conductive member 122. In this way, when the first welding mark 125 is located on one side of the covering member 30, the welding mark cannot be found from the appearance of the covering member 30, which may enhance the aesthetics of the button cell.

Here, the first welding mark 125 and the second welding mark 126 may be staggered from each other, which may improve the flatness of the appearance of the whole button cell and make the appearance of the button cell more beautiful.

Alternatively, the first welding mark 125 and the second welding mark 126 may overlap each other. In this way, during welding, the first welding mark 125 and the second welding mark 126 may fuse with each other, which can enhance the firmness of welding and make the reliability of button cell higher.

Referring to FIG. 4 again, the height of a protruding end surface of the boss portion 1221 relative to the bottom of the lower housing 13 is lower than that of a bottom end surface of the head cover 121 relative to the bottom of the lower housing 13 That is, a set height h1 of the bottom end surface, i.e. protruding end surface of the boss portion 1221 relative to the bottom of the lower housing 13 is lower than a setting height h2 of the bottom end surface of the head cover 121 relative to the bottom of the lower housing 13. In this way, the first tab 25 may be directly overlapped on and welded to the bottom end surface of the boss portion 1221, without contacting the inner wall of the lower housing 13. Of course, when the bottom end surface of the head cover 12 is provided with a housing insulating adhesive 124, the bottom end surface of the insulating adhesive 124 may be consider as that of the head cover 121.

Optionally, referring to FIG. 2, the side of the conductive member 122 away from the boss portion 1221 may be provided with a mounting groove 1223, the position of the mounting groove 1223 corresponding to that of the boss portion 1221, and the liquid injection hole 50 may be located at the groove bottom of the mounting groove 1223, so that the covering member 30 may be installed in the mounting groove 1223. By setting the mounting groove 1223 that can accommodate the covering member 30, the covering member 30 will not protrude from the surface of the button cell 100, resulting in a better appearance. Secondly, the mounting groove 1223 is located at the position corresponding to the boss, so that the protruding height of the boss portion 1221 may be fully utilized to make the whole thickness of the conductive member 122 more uniform.

Figure 5:
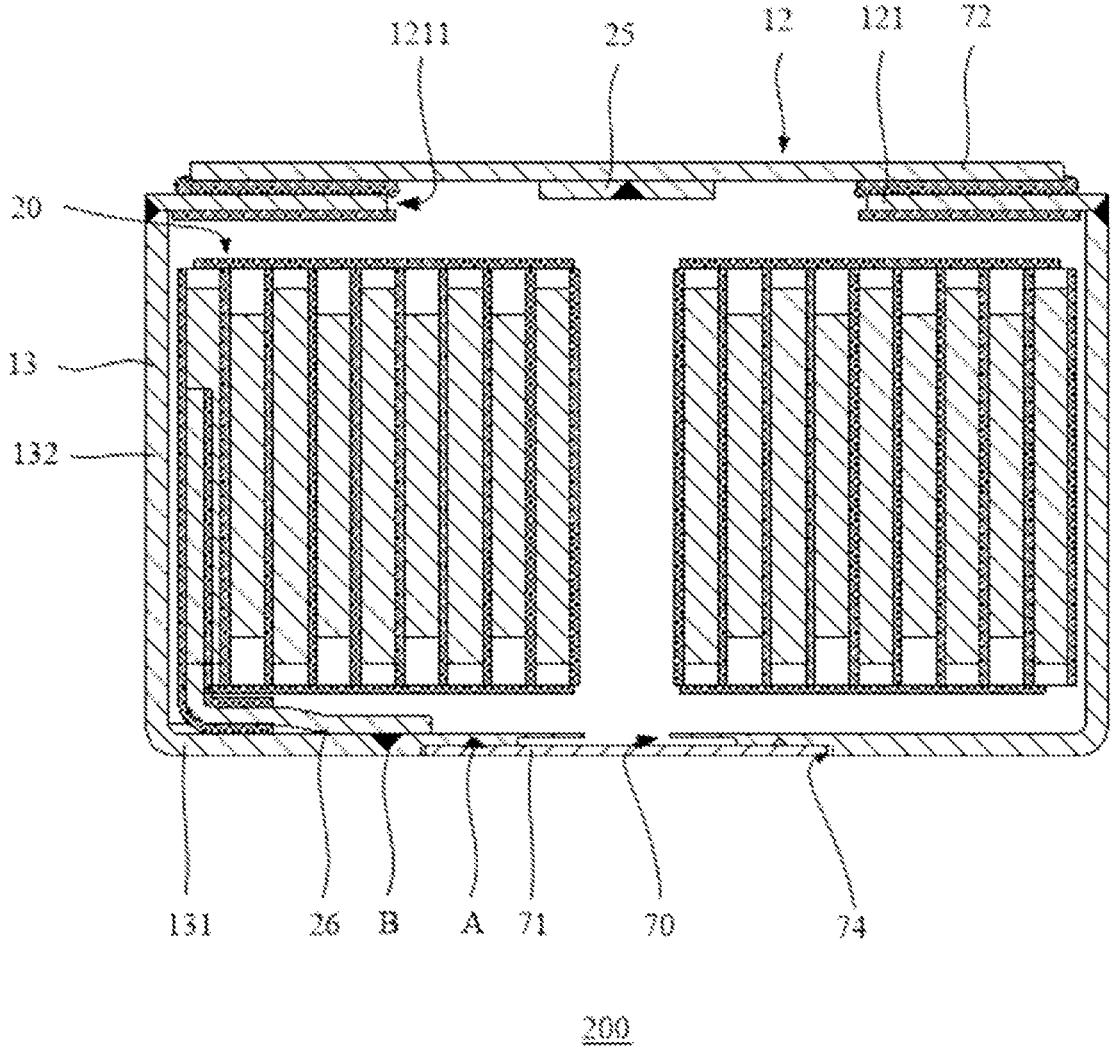
FIG. 5 is a cross-sectional schematic diagram of another structure of the button cell provided by the embodiment of the present application.
Figure 6:
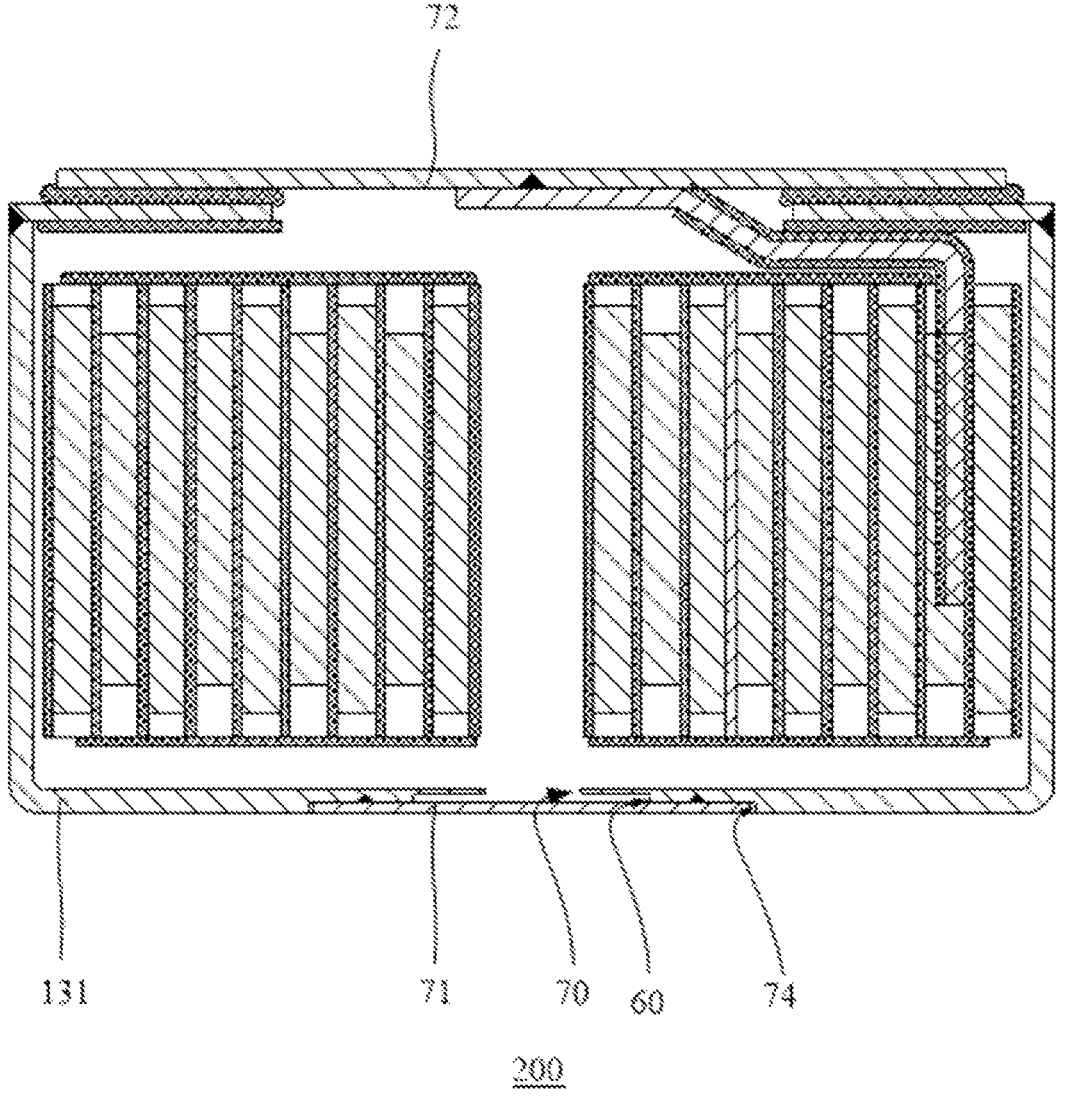
FIG. 6 is a cross-sectional schematic diagram of another structure of the button cell provided by the embodiment of the present application.
Figures 7, 8:
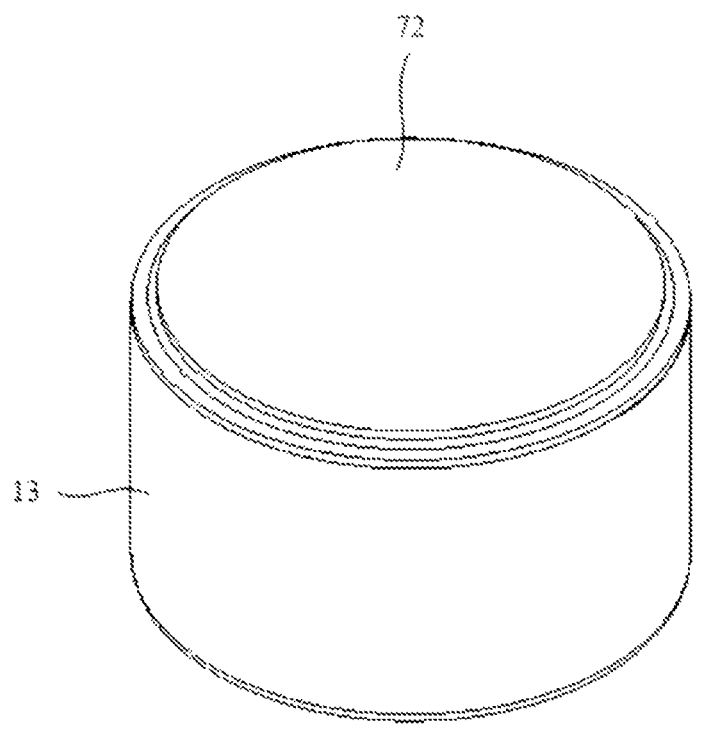
FIG. 7 is an overall structural schematic diagram of another structure of the button cell provided by the embodiment of the present application.
FIG. 8 is a structural schematic diagram of the button cell provided in Embodiment 2 of the present application.

FIG. 5 is a cross-sectional schematic diagram of another structure of the button cell provided by the embodiment of the present application, FIG. 6 is a cross-sectional schematic diagram of another structure of the button cell provided by the embodiment of the present application, and FIG. 7 is an overall structural schematic diagram of another structure of the button cell provided by the embodiment of the present application. Referring to FIG. 5, FIG. 6 and FIG. 7, the liquid injection hole is arranged at the bottom of the housing. The button cell 200 in this embodiment changes the position of the liquid injection hole on the basis of the above embodiments, and the structure of the conductive member and the installation position of the covering member are also changed. Other structures are similar to those shown in FIG. 2 and FIG. 3 above, and will not be repeated here.

As mentioned above, the lower housing 13 includes a bottom wall 131 and a side wall 132 surrounding the bottom wall 131. A bottom end of the side wall 132 is connected with the bottom wall 131. Different from the above, a liquid injection hole 70 is located in the bottom wall 131, and a covering member 71 is welded to the bottom wall 131 to cover the liquid injection hole 70.

In an optional embodiment, the cover plate assembly 12 includes a head cover 121 and a conductive member 72, the head cover 121 is connected to the top end of the side wall 132 and is provided with a through hole 1211, the through hole 1211 is covered by the conductive member 72, and the conductive member 72 is connected with the head cover 121 in an insulated manner; the electrode assembly 20 includes a first tab 25 and a second tab 26, the first tab 25 is welded with the conductive member 72, and the second tab 26 is welded with the bottom wall 131.

When the liquid injection hole 70 is disposed in the bottom wall 131, a welding point A of the covering member 71 and the bottom wall 131 is located at a position of the bottom wall 131 close to the covering member 71, while a welding point B of the bottom wall 131 and the second tab 26 may be located at other positions to keep away from the position of the welding point A, avoid the overlapping of the two welding points, and increase the flatness of the appearance of the whole button cell. The first tab 25 may be directly welded with the conductive member 72.

It can be understood that an outer surface of the bottom wall 131 may be provided with a bottom mounting groove 74, and the liquid injection hole 70 may be located at the bottom of the bottom mounting groove 74. The bottom mounting groove 74 is configured to accommodate the covering member 71 so as to make the covering member 71 installed in the bottom mounting groove 74. Here, by setting the bottom mounting groove 74 that can accommodate the covering member 71, the covering member 71 will not protrude from the surface of the button cell 100, resulting in a better appearance.

In the button cell of the present application, the electrolyte is injected into the hollow portion of the winding core from the liquid injection hole, and the recessed portion is configured to store the residual electrolyte. After the electrolyte is injected, the covering member covers the liquid injection hole and the recessed portion, followed by sealing by means of circumferential overlapping and welding. Of course, the covering member may be arranged approximately coaxially with the liquid injection hole.

In the embodiment of the present application, a button cell includes a housing, an electrode assembly and a covering member. An accommodating cavity is disposed in the housing, the electrode assembly is located in the accommodating cavity, and the housing has a liquid injection hole for injecting electrolyte into the accommodating cavity; an outer surface of the housing is provided with a recessed portion, which is recessed towards the inner side of the accommodation cavity, and the recessed portion is located at the orifice of the liquid injection hole and communicated with the liquid injection hole; the covering member is welded to the outer side of the housing to cover the recessed portion and the liquid injection hole. In the above embodiment, since the recessed portion is disposed at the orifice of the liquid injection hole and a mouth of the recessed portion opens towards the outer side of the housing, after the injection of electrolyte is completed, the remaining electrolyte near the orifice of the liquid injection hole will be contained in the recessed portion rather than being attached to the outer surface of the housing, so neither the welding operation of the covering member and the housing, nor the sealing of welding will be affected. Therefore, the safety and stability of the button cell is better.

The present application also provides an electronic equipment, including an electronic equipment body and a button cell, the button cell providing electric energy for the electronic equipment body.

The structure of the button cell in the electronic equipment provided by the present application is the same as that of the button cell described above, and can bring the same or similar technical effects, which will not be repeated here.

Embodiment 2

Since the interior of the button cell belongs to a closed space, the sealing performance is very important for the button cell. In the related technology, the electrolyte is first injected into the accommodating cavity in which an electric core is provided, and then the conductive member is penetrated into the through hole of the housing, so that the conductive member is riveted with the through hole, and an insulating sealing rubber ring is disposed between the conductive member and the through hole. However, when the conductive member is riveted with the through hole, the housing will vibrate, and the electrolyte in the accommodating cavity will splash to the sealing rubber ring, causing partial failure of the sealing rubber ring and poor sealing performance.

In order to solve the above problems, in a button cell provided by the embodiment of the present application, a through hole of a head cover is covered by a conductive member, the head cover and the conductive member are connected together in an insulated and sealed manner through a sealing rubber ring, an electric core is placed in an accommodating cavity of a bottom housing so as to make a first tab of the electric core welded with an inner bottom wall of the bottom housing, and then the head cover provided with the conductive member is hermetically connected with the bottom housing so as to make a second tab of the electric core electrically connected with the conductive member. Finally, the head cover provided with the conductive member is hermetically connected with the bottom housing, and the electrolyte is injected into the accommodating cavity from a liquid injection port of the conductive member. After the injection of electrolyte is completed, a covering member covers the liquid injection port and is connected with the liquid injection port in a sealed manner by bonding or welding, thereby improving the sealing performance of the button cell.

As shown in FIG. 8, the button cell provided by the embodiment of the present application includes: a housing 10, an electric core 20 located in an accommodating cavity 1011 of the housing 10, and a conductive member 30 arranged on and connected with the housing 10 in an insulated manner. The conductive member 30 is provided with a liquid injection port 301 for injecting electrolyte into the accommodating cavity 1011 and a covering member 40 for covering the liquid injection port 301, and the covering member 40 is hermetically connected with the liquid injection port 301. The electric core 20 is provided with a first tab 201 and a second tab 202. The first tab 201 is electrically connected with the housing 10 by welding, etc., and the second tab 202 is electrically connected with the conductive member 30 by welding and bonding. The housing 10 and the conductive member 30 are each electrically connected with an electronic equipment, so that the electric core 20 may provide electric energy to the electronic equipment through the housing 10 and the conductive member 30.

Figure 9:
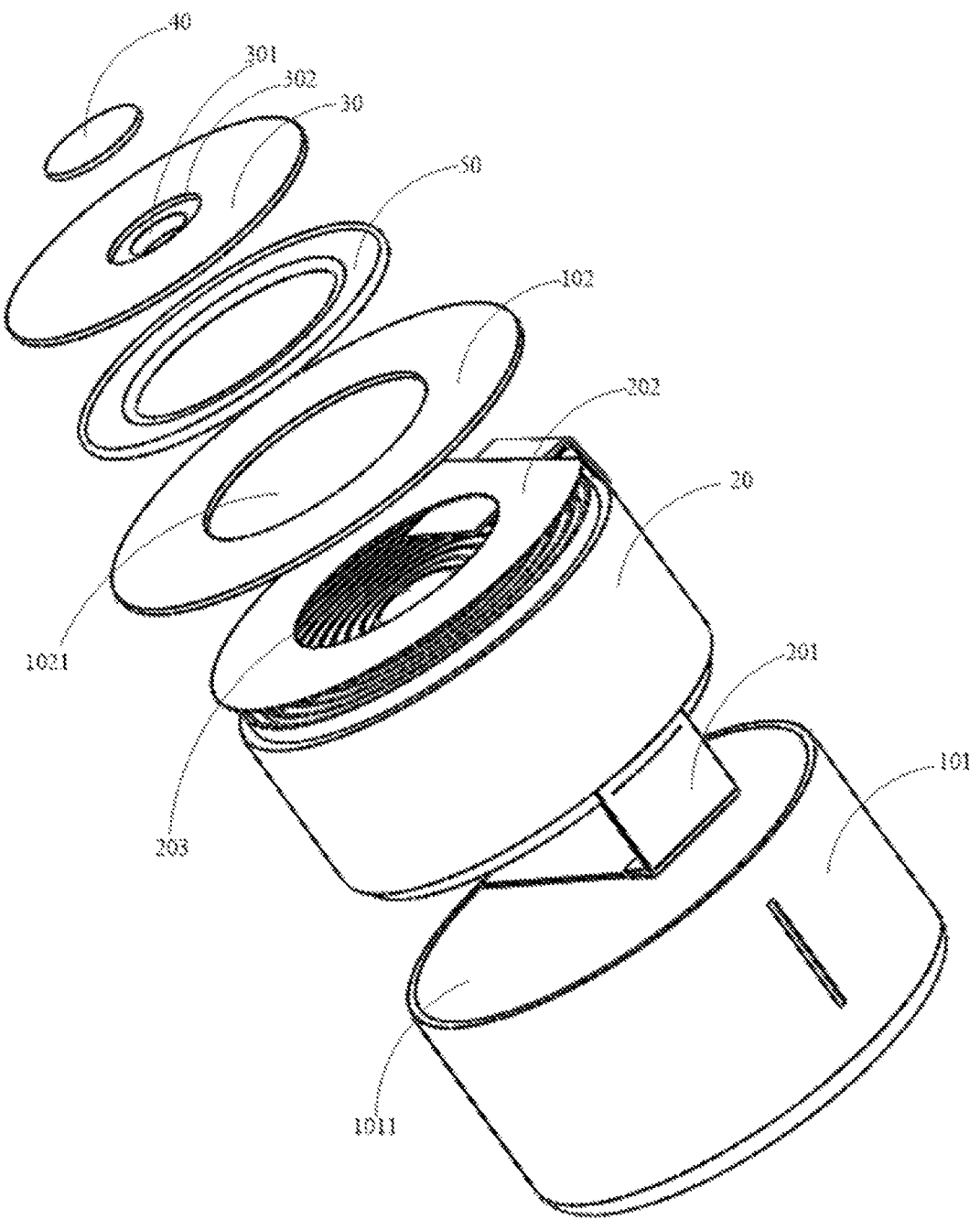
FIG. 9 is an exploded structural schematic diagram of the button cell provided in Embodiment 2 of the present application.
Figure 10:
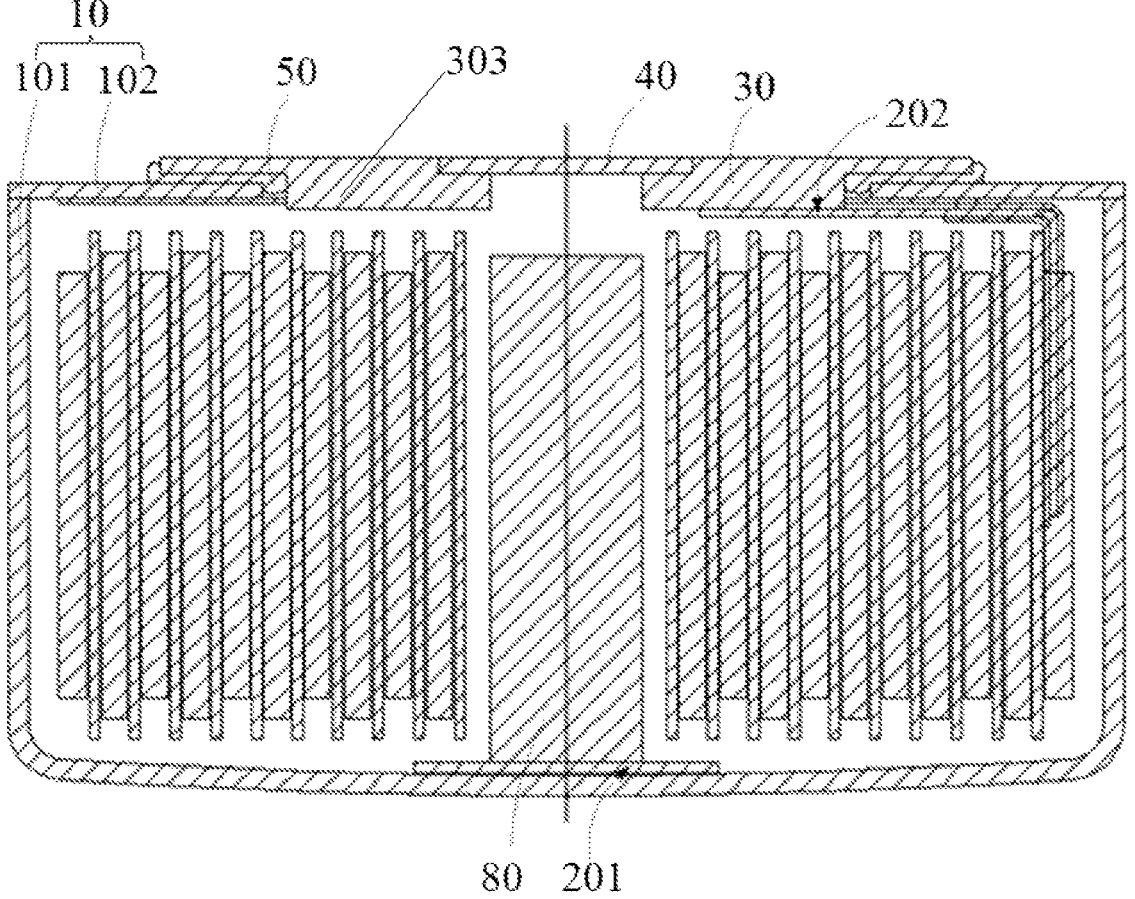
FIG. 10 is an internal structural schematic diagram of a first structure of the button cell provided in Embodiment 2 of the present application.
Figure 11:
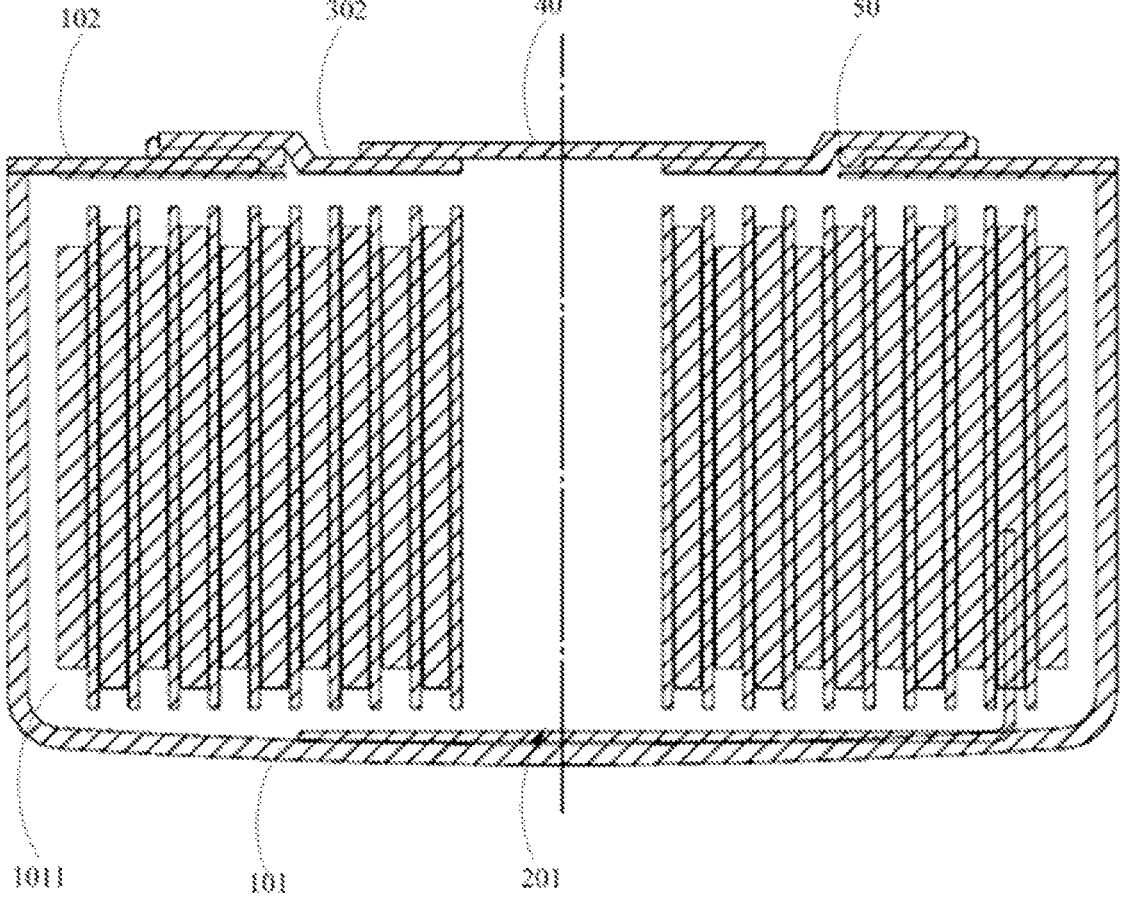
FIG. 11 is an internal structure schematic diagram of a second structure of the button cell provided in Embodiment 2 of the present application.

As shown in FIG. 9 to FIG. 11, the housing 10 includes a bottom housing 101 and a head cover 102. The bottom housing 101 is provided with a groove extending towards a bottom wall of the bottom housing 101, the groove forms an accommodating cavity 1011 for accommodating the electric core 20, and the head cover 102 covers an opening communicated with the accommodating cavity 1011, so that the housing 10 with an accommodating cavity 1011 is formed by enclosing of the bottom housing 101 and the head cover 102. In order to improve the sealing performance, the head cover 102 and the bottom housing 101 are connected in a sealed manner, for example, the head cover 102 and the bottom housing 101 are welded, etc.

The cross section of the housing 10 may be of any shape such as a circle, an ellipse, a polygon, etc., which is not limited in the present embodiment.

Since the electric core 20 needs to provide electric energy for the electronic equipment through the housing 10 and the conductive member 30, thus, the housing 10 and the conductive member 30 may be made of stainless steel, copper, iron and other metal materials.

The head cover 102 is provided with a through hole 1021 to make the head cover 102 form a ring structure. The through hole 1021 is covered by the conductive member 30, and a sealing rubber ring 50 is arranged between the conductive member 30 and the through hole 1021. The sealing rubber ring 50 makes the conductive member 30 and the through hole 1021 connected in an insulated and sealed manner. That is, the conductive member 30 is bonded to the edge of the through hole 1021 through the sealing rubber ring 50, and covers the through hole 1021 of the head cover 102. The through hole 1021 may be circular, elliptical, polygonal, etc.

In order to improve the sealing performance of connection between the conductive member 30 and the head cover 102, the conductive member 30 may be bonded to the head cover 102 through the sealing rubber ring 50 by means of heating and pressurization. In this way, the bonding reliability of the sealing rubber ring 50 may be improved, thereby improving the sealing performance of connection between the conductive member 30 and the head cover 102.

Figure 12:
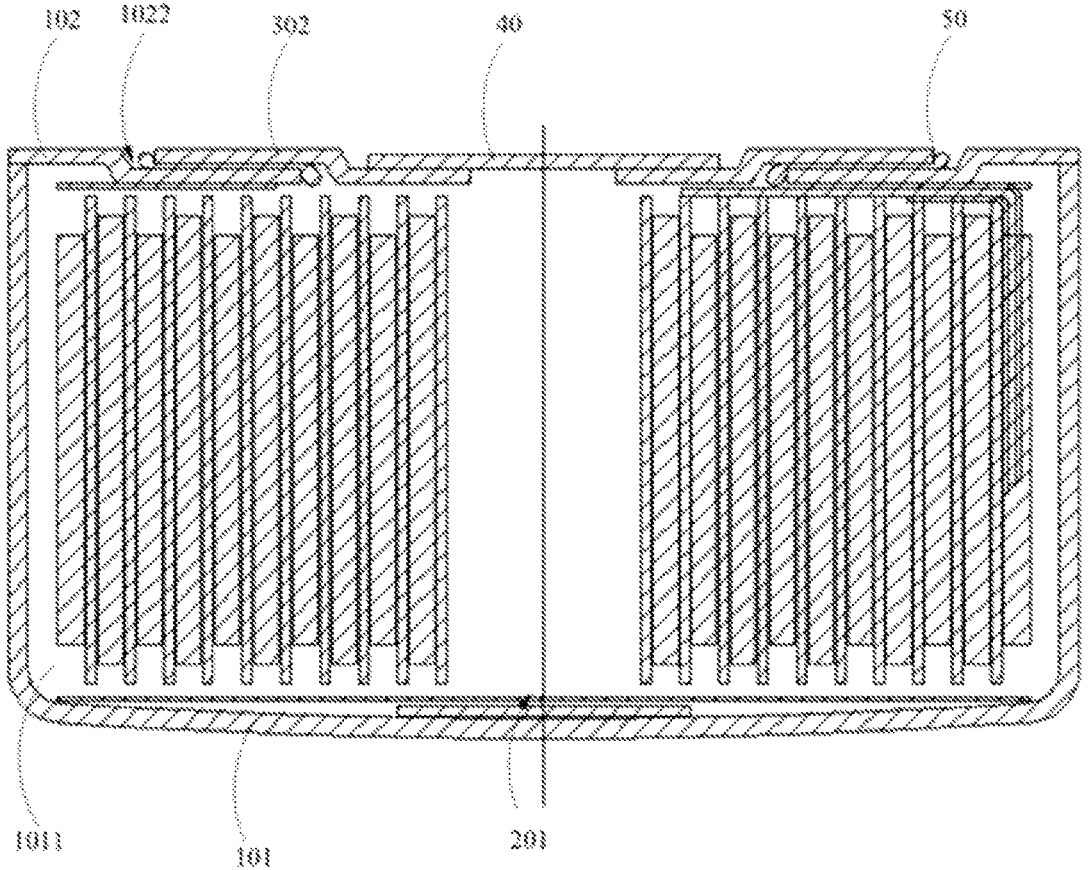
FIG. 12 is an internal structure schematic diagram of a third structure of the button cell provided in Embodiment 2 of the present application.

Further, the conductive member 30 may protrude beyond the surface of the head cover 102, or the head cover 102 may also be provided with a holding groove 1022 for placing the conductive member. As shown in FIG. 12, the conductive member 30 is located in the holding groove 1022, and the upper surface of the conductive member 30 is flush with that of the head cover 102. When the conductive member 30 is connected with the head cover 102 in an insulated and sealed manner through the sealing rubber ring 50, under heating and pressurizing, glue overflow will occur to the sealing rubber ring 50. In this way, the glue overflow is located in the holding groove 1022 and will not overflow the surface of the head cover 102. In this way, the surface of the head cover 102 is relatively flat, and the overall structure of the button cell is more compact, which improves the overall aesthetics of the button cell.

In one embodiment, the through hole 1021 is a circular hole, the conductive member 30 is in a shape of disc, and the diameter of the through hole 1021 is smaller than that of the conductive member 30. Therefore, the edge of the conductive member 30 and the edge of the through hole 1021 are at least partially overlapped in a radial direction, and the through hole 1021 and the conductive member 30 are tightly bonded by heating and pressurizing through the sealing rubber ring 50, which can allow a tighter connection between the connection between the through hole 1021 and the conductive member 30 under high heat and high pressure, thereby improving the sealing performance of the button cell.

With a larger unilateral overlapped part of the edge of the conductive member 30 and the edge of the through hole 1021 in a radial direction, the sealing performance is better. Therefore, in one embodiment, the unilateral overlapped part of the conductive member 30 and the through hole 1021 in the radial direction is greater than or equal to 0.3 mm in size. In this way, the sealing area between the conductive member 30 and the through hole 1021 is increased, so that the sealing performance between the conductive member 30 and the through hole 1021 is improved.

Further, as shown in FIG. 10, the conductive member 30 is also provided with an extension 303 penetrating through the through hole 1021. For example, the conductive member 30 is formed as a T-shaped conductive member 30. In this way, the extension 303 and the hole wall of the through hole 1021 are hermetically connected through the sealing rubber ring 50, which further increases the sealing area between the conductive member 30 and the through hole 1021, so that the sealing performance between the conductive member 30 and the through hole 1021 is improved. The sealing rubber ring 50 may be made of soluble material, which improves the corrosion resistance to electrolyte and the sealing performance of the sealing rubber ring 50.

The sealing rubber ring 50 is annular. Upon heating and pressurizing of the conductive member 30 and the head cover 102, the outer edge of the sealing rubber ring 50 overflows the joint between the conductive member 30 and the head cover 102, and the inner edge of the sealing rubber ring 50 overflows the joint between the sealing rubber ring 50 and the edge of the through hole 1021 of the head cover 102. In this way, the connection reliability of the sealing rubber ring 50 in connecting with the conductive member and the head cover 102 can be guaranteed.

On the basis of the above embodiments, as shown in FIG. 8 to FIG. 11, the conductive member 30 is also provided with a liquid injection port 301 for injecting electrolyte into the accommodating cavity 1011. The liquid injection port 301 may be of any shape such as circle, quadrangle, polygon, etc. In one embodiment, the liquid injection port 301 is concentric with the conductive member 30, and the conductive member 30 is concentric with the accommodating cavity 1011 in the housing 10 for accommodating the electric core 20.

In one embodiment, in order to improve the sealing performance between the covering member 40 and the liquid injection port 301, a counter bore 302 is arranged at one end of the liquid injection port 301 away from the accommodating cavity 1011, the diameter of the counter bore 302 is larger than that of the liquid injection port 301, and the counter bore 302 is communicated and coaxial with the liquid injection port 301. The shape of the counter bore 302 is the same as that of the liquid injection port 301, that is, when the liquid injection port 301 is circular, the counter bore 302 is also circular. For example, the depth of the counter bore 302 may be between 0.01 mm and 0.5 mm.

The liquid injection port 301 is covered with a covering member 40, that is, the covering member 40 is located in the counter bore 302. Due to the smaller depth of the counter bore 302, the covering member 40 may be a sheet structure, and located in the counter bore 302 to cover the liquid injection port 301. In order to improve the sealing performance, the covering member 40 is hermetically connected with the liquid injection port 301. For example, the covering member 40 and the liquid injection port 301 may be welded with each other, that is, after the electrolyte is injected into the accommodating cavity 1011 through the liquid injection port 301, the joint between the covering member 40 and the counter bore 302 is subjected to welding outside of the housing 10, so as to improve the sealing performance.

For example, the covering member 40 may be a sealing nail which is located in the counter bore 302, and the sealing nail and the counter bore 302 are connected together by welding of their joint.

As shown in FIG. 11, when the sealing nail and the liquid injection port 301 are sealed by welding, in order to facilitate welding, the diameter of the counter bore 302 is larger than that of a nail cap of the sealing nail, and the part of the sealing nail which is located in the counter bore 302 has a welding mark. That is, a welding to the joint between the sealing nail and the conductive member 30 may be performed in the counter bore 302 by a welding equipment. For example, the laser beam of a laser welding equipment may extend into the counter bore 302 to weld the sealing nail and the conductive member 30 together.

Optionally, the covering member 40 may also be located in the counter bore 302 and bonded with the counter bore by means of the sealing rubber ring and so on, so as to simplify the operation process.

In an optional embodiment, the electric core 20 is a winding-type electric core 20. Specifically, the winding-type electric core 20 includes a first plate, a second plate and a diaphragm for separating the first plate from the second plate; the first plate is provided with a first tab 201, which may be arranged on the first plate by means of welding, and the second plate is provided with a second tab 202, which may be arranged on the second plate by welding. During winding, the first plate, the second plate and the diaphragm are wound layer by layer in the same direction from the initial end of winding, and finally form a winding-type electric core 20.

It can be understood that the first plate of the electric core 20 may be a positive plate and the second plate may be a negative plate. At this time, the first tab 201 arranged on the first plate is a positive tab and the second tab 202 arranged on the second plate is a negative tab. In a specific implementation, the electric core 20 is contained in the accommodating cavity 1011, the positive tab is electrically connected with the inner bottom wall of the bottom housing 101 by means of welding to allow the bottom housing 101 to be formed as a positive electrode of the button cell, and the negative tab is electrically connected with the conductive member 30 to allow the conductive member 30 to be formed as a negative electrode of the button cell. When the button cell is applied to the electronic equipment, the bottom housing 101 is connected with the positive electrode of the electronic equipment to be conductive, and the conductive member 30 is connected with the negative electrode of the electronic equipment to be conductive, so as to enable the electric core 20 to supply power to the electronic equipment.

Alternatively, the first plate of the electric core 20 may be a negative plate and the second plate may be a positive plate. At this time, the first tab 201 arranged on the first plate is a negative tab and the second tab 202 arranged on the second plate is a positive tab. In a specific implementation, the electric core 20 is contained in the accommodating cavity 1011, the negative tab is electrically connected with the bottom housing 101 by means of welding to allow the bottom housing 101 to be formed as the negative electrode of the button cell, and the positive tab is electrically connected with the conductive member 30 to allow the conductive member 30 to be formed as the positive electrode of the button cell. When the button cell is applied to the electronic equipment, the bottom housing 101 is connected with the negative electrode of the electronic equipment to be conductive, and the conductive member 30 is connected with the positive electrode of the electronic equipment to be conductive, so as to enable the electric core 20 to supply power to the electronic equipment.

In one embodiment, the second tab 202 is electrically connected with one end of the extension 303 of the conductive member 30 extending into the accommodating cavity 1011. In this way, the contact area between the second tab 202 and the conductive member 30 may be increased, so as to improve the reliability of the electrical connection. In order to prevent the head cover 102 from interfering with the connection between the second tab 202 and the extension 303, after the extension 303 extends into the accommodating cavity 1011, one end of the extension 303 facing the accommodating cavity 1011 exceeds the inner wall of the head cover 102. In this way, when the second tab 202 is connected with the end face of the extension 303, a gap is formed between the second tab 202 and the inner wall of the head cover 102, alternatively, an insulating layer is arranged between the inner wall of the head cover 102 and the second tab 202 to improve the reliability of the electrical connection between the second tab 202 and the conductive member 30.

It should be noted that the first tab 201 is electrically connected with the head cover 102 in the housing 10 by means of welding or bonding.

Optionally, in order to improve the reliability of the electrical connection between the first tab 201 and the second tab 202, an insulating layer may be disposed in the circumferential direction of the first tab 201 and the second tab 202, only exposing the part of the first tab 201 or the second tab 202 which is electrically connected with the bottom housing 101 or the conductive member 30, respectively.

Optionally, the winding-type electric core 20 may form an electric core cavity 203 in its center during winding. When the electric core 20 is placed in the accommodating cavity 1011, the electric core cavity 203 is arranged concentrically with the liquid injection port 301. In this way, when the electrolyte is injected into the accommodating cavity 1011, the plates and diaphragm in the electric core 20 will not block the injection of the electrolyte, thereby improving the efficiency of the injection of electrolyte and enhancing the production efficiency of button cell.

In one embodiment, as shown in FIG. 10, the butting piece 80 may also be inserted into the electric core cavity 203 from the liquid injection port 301. The butting piece 80 may be of a columnar structure, such as a cylinder, prism and other structures, may be composed of one columnar piece, or may be composed of two or more columnar pieces connected from head to tail in sequence. When the first tab 201 is welded with the inner bottom wall of the bottom housing 101, the butting piece 80 is first inserted into the electric core cavity 203, so as to make a first end of the butting piece 80 butted to the first tab 201, and a pressure is applied on a second end of the butting piece 80 to make the first tab 201 tightly contact with the inner bottom wall of the bottom housing 101 through the extrusion of the butting piece 80, followed by welding. In this way, the reliability of welding between the first tab 201 and the bottom housing 101 may be improved, thereby improving the reliability of the electrical connection between the first tab 201 and the bottom housing 101.

It should be noted that in order to facilitate the user's operation, the second end of the butting piece 80 may protrude out of the head cover 102 of the housing 10. After the welding of the first tab 201 in the button cell with the inner bottom wall of the bottom housing 101 is completed and the head cover 102 provided with the conductive member 30 is hermetically connected with the bottom housing 101, the butting piece 80 may be taken out from the electric core cavity 203 along the liquid injection port 301.

During welding, a vibration may occur. If the bottom housing 101 and the head cover 102 are first hermetically connected and then the first tab 201 is welded with the bottom housing 101, the vibration will occur, resulting in an offset between the bottom housing 101 and the head cover 102 and a dislocation between the bottom housing 101 and the head cover 102, which causes loosening or failure of the sealed connection between the bottom housing 101 and the head cover 102 and finally leads to bad sealing performance of the button electric core. Therefore, in this embodiment, the electric core 20 provided with the first tab 201 and the second tab 202 is first placed in the accommodating cavity 1011 of the bottom housing 101, and the butting piece 80 is inserted into the electric core cavity 203 of the electric core 20. The first tab 201 is tightly contact with the inner bottom wall of the bottom housing 101 under the extrusion of the butting piece 80, and then the bottom housing 101 and the first tab 201 are welded by a welding equipment to realize the electric connection between the first tab 201 and the bottom housing 101. Then, the head cover 102 provided with the conductive member 30 is connected in a sealed manner with the bottom housing 101 by welding or bonding. Although the vibration occurs during welding between the bottom housing 101 and the head cover 102, the problem of loose connection between the first tab 201 and the inner wall of the bottom housing 101 due to such vibration will not arise because the butting piece 80 is always butted to the first tab 201, which ensures the reliability of the connection between the first tab 201 and the bottom housing 101, improves the reliability of the sealing connection between the bottom housing 101 and the head cover 102, and thus enhances the sealing performance of the button cell.

In a specific implementation of the button cell provided by the embodiment of the present application, first, the head cover 102 and the conductive member 30 are connected together in an insulated and sealed manner via the sealing rubber ring 50 by means of heating and pressurization, and then the electric core 20 is placed into the accommodating cavity 1011 in the bottom housing 101 and the butting piece 80 is inserted into the electric core cavity 203. The first end of the butting piece 80 is butted on the first tab 201, and the second end of the butting piece 80 extends out of the head cover 102. Under the extrusion of the butting piece 80, the first tab 201 is tightly contact with the inner bottom wall of the bottom housing 101. The first tab 201 is welded with the bottom housing 101 through a welding equipment, and then the head cover 102 provided with the conductive member 30 covers the bottom housing 101. The bottom housing 101 and the head cover 102 are connected in a sealed manner by bonding or welding, and the second tab 202 of the electric core 20 is electrically connected with the conductive member 30. Upon the removal of the butting piece 80, the electrolyte is injected into the accommodating cavity from the liquid injection port 301. After the injection of electrolyte is completed, the liquid injection port 301 is covered by the covering member 40, and the covering member 40 is hermetically connected with the liquid injection port 301 by bonding or welding.

In a button cell provided by the embodiment of the present application, a through hole of a head cover is covered by a conductive member, the head cover and the conductive member are connected together in an insulated and sealed manner through a sealing rubber ring, an electric core is placed in an accommodating cavity of a bottom housing so as to make a first tab of the electric core welded with an inner bottom wall of the bottom housing, and then the head cover provided with the conductive member is hermetically connected with the bottom housing so as to make a second tab of the electric core electrically connected with the conductive member. Finally, the head cover provided with the conductive member is hermetically connected with the bottom housing, and the electrolyte is injected into the accommodating cavity from a liquid injection port of the conductive member. After the injection of electrolyte is completed, a covering member covers the liquid injection port and is connected with the liquid injection port in a sealed manner by bonding or welding, thereby improving the sealing performance of the button cell.

The embodiment of the present application also provides an electronic equipment, including an electronic equipment body and a button cell provided in Embodiment 1, and the button cell provides electric energy for the electronic equipment body.

The structure and working principle of the button cell have been described in detail in Embodiment 1. Here, it will not be repeated in detail.

The electronic equipment provided by the present application includes an electronic equipment body and a button cell that provides electric energy for the electronic equipment body. In the button cell, a through hole of a head cover is covered by a conductive member, the head cover and the conductive member are connected together in an insulated and sealed manner through a sealing rubber ring, an electric core is placed in an accommodating cavity of a bottom housing so as to make a first tab of the electric core welded with an inner bottom wall of the bottom housing, and then the head cover provided with the conductive member is hermetically connected with the bottom housing so as to make a second tab of the electric core electrically connected with the conductive member; finally, the electrolyte is injected into the accommodating cavity from a liquid injection port of the conductive member; after the injection of electrolyte is completed, a covering member covers the liquid injection port and is connected with the liquid injection port in a sealed manner by bonding or welding, thereby improving the sealing performance of the button cell.

Embodiment 3

Figure 13:
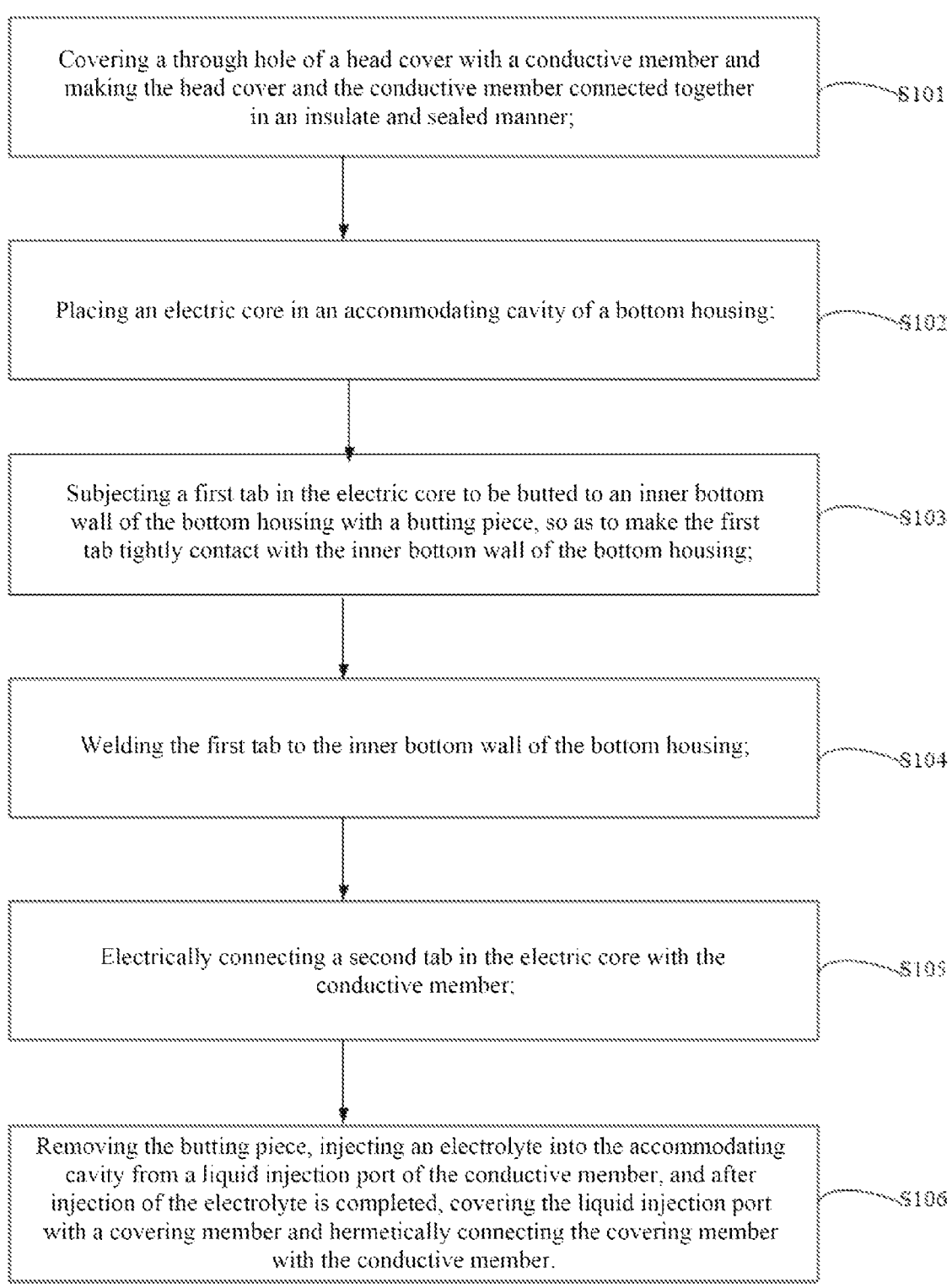
FIG. 13 is a flowchart of a manufacturing method of a button cell provided in Embodiment 3 of the present application.

As shown in FIG. 13, the embodiment of the present application also provides a manufacturing method of a button cell, which includes the following steps.

At S101, a through hole of a head cover is covered by a conductive member, and the head cover and the conductive member are connected together in an insulated and sealed manner.

A sealing rubber ring is disposed between the head cover and the conductive member. The head cover and the conductive member are extruded and connected together by means of heating and pressurizing, and the sealing rubber ring is deformed by extrusion, so as to improve the sealing performance between the head cover and the conductive member.

At S102, an electric core is placed in an accommodating cavity of a bottom housing.

At S103, a first tab in the electric core is subjected to be butted to an inner bottom wall of the bottom housing with a butting piece to make the first tab tightly contact with the inner bottom wall of the bottom housing.

At S104, the first tab is welded to the inner bottom wall of the bottom housing.

At S105, a second tab in the electric core is electrically connected with the conductive member.

At S106, the butting piece is removed and an electrolyte is injected into the accommodating cavity from a liquid injection port in the conductive member. After injection of electrolyte is completed, a covering member covers the liquid injection port and is hermetically connected with the conductive member.

It should be noted that, it is also possible that the second tab in the electric core is first electrically connected with the conductive member before the head cover provided with the conductive member is hermetically connected with the bottom housing.

Optionally, before the head cover and the conductive member are connected together in an insulated and sealed manner through a sealing rubber ring, the following step is further included.

A passivation treatment is performed on the head cover and the conductive member.

The passivation treatment refers to a process that metal is oxidized by a strong oxidant or an electrochemical method to make its surface inactive, i.e. passivated. This treatment is a method to transform the metal surface into a state that is not easy to be oxidized so as to delay the corrosion rate of the metal.

Optionally, before the first tab in the electric core is welded with the bottom housing, the following step is further included.

The butting piece that is placed in the electric core cavity is extruded from the liquid injection port; and the butting piece extrudes the first tab in the electrode core to make it tightly contact with the inner bottom wall of the housing.

In the manufacturing method of the button battery provided by the embodiment of the present application, the through hole of the head cover is covered by the conductive member, the head cover and the conductive member are connected together in an insulated and sealed manner through the sealing rubber ring, the electric core is placed in the accommodating cavity of the bottom housing so as to make the first tab of the electric core welded with the inner bottom wall of the bottom housing, and then the head cover provided with the conductive member is hermetically connected with the bottom housing so as to make the second tab of the electric core electrically connected with the conductive member; finally, the electrolyte is injected into the accommodating cavity from a liquid injection port of the conductive member; after the injection of electrolyte is completed, the covering member covers the liquid injection port and is connected with the liquid injection port in a sealed manner, thereby improving the sealing performance of the button cell.

Embodiment 4

As shown in FIG. 14, the embodiment of the present application further provides another manufacturing method of a button cell, the following steps are included.

At S01, a head cover and a conductive member are connected together in an insulated and sealed manner, where a through hole of the head cover is covered by the conductive member.

At S02, a second tab in an electric core is electrically connected with the conductive member.

At S03, the electric core that is electrically connected with the conductive member is placed in an accommodating cavity formed by enclosing of a bottom housing and the head cover that is provided with the conductive member.

At S04, the head cover provided with conductive member is hermetically connected with the bottom housing.

At S05, a first tab in the electric core is welded with the bottom housing.

At S06, an electrolyte is injected into the accommodating cavity from a liquid injection port of the conductive member, and after the injection of electrolyte is completed, a covering member covers the liquid injection port and is hermetically connected with the conductive member.

It should be noted that, it is also possible that, after the head cover provided with the conductive member is connected with the bottom housing in a sealed manner, the second tab in the electrode core is electrically connected with the conductive member.

In a specific implementation of the manufacturing method of the button cell provided by the embodiment of the present application, firstly, the head cover and the conductive member are connected in an insulated and sealed manner through the sealing rubber ring by means of heating and pressurization, the conductive member is electrically connected with the second tab, the electrode core that is electrically connected with the conductive member through the second tab is placed in the accommodating cavity, the bottom housing is covered by the head cover provided with the conductive member, and the bottom housing is hermetically connected with the head cover by bonding or welding. The butting piece may be inserted from the liquid injection port and butted to the first tab so as to make the first tab tightly contact with the inner bottom wall of the bottom housing. The first tab is welded to the bottom housing by a welding equipment, and then the butting piece is taken out from the liquid injection port, and the covering member covers the liquid injection port and is bonded to the conductive member by welding or bonding. In order to improve the sealing performance, a seal may also be added at the covering member and the liquid injection port, so as to improve the sealing performance of the button cell.

When the first tab and the inner bottom wall of the bottom housing are welded first and then the bottom housing and head cover are welded, the first tab and the bottom housing will shake due to welding, which will loosen the welding between the first tab and the inner bottom wall of the bottom housing, resulting in the problem of low reliability of the electrical connection between the first tab and the bottom housing. In this embodiment, welding the bottom housing and the head cover first and then welding the first tab and the inner bottom wall of the bottom housing, can improve the welding reliability of the first tab and the bottom housing, thereby improving the electrical connection reliability between the first tab and the bottom housing.

In this description, each embodiment or implementation is described in a progressive manner. Each embodiment focuses on the differences from other embodiments. The identical and similar parts among embodiments may be referred to each other.

Finally, it should be noted that the above embodiments are only used to illustrate the technical solutions of the present application, not to limit the present application; although the present application has been described in detail with reference to the foregoing embodiments, those skilled in the art should understand that they may still make modifications to the technical solutions described in the above embodiments, or make equivalent replacements for some or all of the technical features; and these modifications or replacements do not make the essence of the corresponding technical solutions depart from the scope of the technical solutions of embodiments of the present application.

What is claimed is:

1. A button cell, comprising: a housing, an electrode assembly and a covering member, wherein an accommodating cavity is disposed in the housing, the electrode assembly is located in the accommodating cavity, and the housing is provided with a liquid injection hole for injecting electrolyte into the accommodating cavity;

an outer surface of the housing is provided with a recessed portion, which is recessed towards an inner side of the accommodation cavity, and the recessed portion is located at an orifice of the liquid injection hole and communicated with the liquid injection hole; the covering member is welded to an outer side of the housing to cover the recessed portion and the liquid injection hole;

the housing comprises a lower housing and a cover plate assembly, the lower housing and the cover plate assembly enclosing together to form the accommodation cavity;

the lower housing comprises a bottom wall and a side wall surrounding the bottom wall, a bottom end of the side wall is connected with the bottom wall;

the cover plate assembly comprises a head cover and a conductive member, the head cover is connected to a top end of the side wall and is provided with a through hole, the through hole is covered by the conductive member, and the conductive member is connected with the head cover in an insulated manner; and the electrode assembly comprises a first tab and a second tab, the first tab is welded with the conductive member, and the second tab is welded with the bottom wall;

the conductive member comprises a boss portion, and the boss portion is arranged to correspond to the through hole of the head cover and protrudes beyond an outer side of other parts of the conductive member.

2. The button cell according to claim 1, wherein the recessed portion surrounds the orifice along a circumferential direction of the liquid injection hole, so as to make the recessed portion form a counter bore structure.

3. The button cell according to claim 1, wherein the liquid injection hole is located in the conductive part, the covering member is welded to the conductive member to cover the recessed portion and the liquid injection hole.

4. The button cell according to claim 3, wherein the conductive member comprises a boss portion, and the boss portion is arranged to extend into an interior of the accommodation cavity through the through hole; and the electrode assembly comprises a first tab, and the first tab is electrically connected with the boss portion.

5. The button cell according to claim 4, wherein the covering member and the conductive member are welded with each other to form a first welding mark, the first welding mark being located on a side of the conductive member facing the covering member; and the first tab and the boss portion are welded with each other to form a second welding mark, the second welding mark being located on a side of the conductive member away from the covering member; the first welding mark and the second welding mark are staggered; or the first welding mark and the second welding mark are overlapped each other.

6. The button cell according to claim 4, wherein a height of a protruding end face of the boss portion relative to a bottom of the lower housing is lower than that of a bottom end face of the head cover relative to the bottom of the lower housing; or a side of the conductive member away from the boss portion is provided with a mounting groove, the mounting groove corresponds to the boss portion, the liquid injection hole is located at a groove bottom of the mounting groove, and the covering member is installed in the mounting groove.

7. The button cell according to claim 1, wherein the liquid injection hole is located in the bottom wall, and the covering member is welded to the bottom wall to cover the liquid injection hole.

8. An electronic equipment, comprising an electronic equipment body and the button cell according to claim 1, wherein the button cell provides electric energy for the electronic equipment body.

9. A button cell, comprising a housing, an electric core and a conductive member, wherein the housing comprises a bottom housing and a head cover, the head cover is connected with the bottom housing in a sealed manner, the bottom housing and the head cover enclose together to form an accommodating cavity for holding the electric core, the head cover is provided with a through hole communicated with the accommodating cavity, and the conductive member covers the through hole and is connected with the head cover through a sealing rubber ring in an insulated and sealed manner;

the conductive member is also provided with a liquid injection port for injecting electrolyte into the accommodating cavity, the liquid injection port is covered with a covering member, and the covering member is hermetically connected with the liquid injection port;

the electric core has a first tab and a second tab, the first tab is butted to and welded with an inner bottom wall of the bottom housing, and the second tab is electrically connected with the conductive member.

10. The button cell according to claim 9, wherein the conductive member is provided with an extension penetrating through the through hole, the extension extends into the accommodating cavity, and the second tab is electrically connected with one end of the extension facing the accommodating cavity.

11. The button cell according to claim 9, wherein the covering member is a sealing nail; one end of the liquid injection port away from the accommodating cavity is provided with a counter bore, the diameter of the counter bore is larger than that of the liquid injection port, the counter bore is communicated with the liquid injection port, and the sealing nail is located in the counter bore and hermetically connected with the counter bore; and the sealing nail is welded with the counter bore.

12. The button cell according to claim 9, wherein an electric core cavity is formed at a center of the electric core, and the electric core cavity is concentric with the housing and the liquid injection port; or the head cover is provided with a counter bore, the conductive member is located in the counter bore, and an upper surface of the conductive member is flush with that of the head cover.

13. The button cell according to claim 9, wherein a cross section of the housing is circular; or the electric core is a winding-type electric core.

14. The button cell according to claim 9, further comprising a butting piece, the butting piece is located in the electric core cavity and is concentric with the electric core cavity, and one end of the butting piece is butted to the first tab to make the first tab tightly contact with the inner bottom wall of the bottom housing.

15. An electronic equipment, comprising an electronic equipment body and the button cell according to claim 9, wherein the button cell provides electric energy for the electronic equipment body.

16. A manufacturing method of a button cell, comprising the following steps:

covering a through hole of a head cover with a conductive member and making the head cover and the conductive member connected together in an insulate and sealed manner;

placing an electric core in an accommodating cavity of a bottom housing;

subjecting a first tab in the electric core to be butted to an inner bottom wall of the bottom housing with a butting piece, so as to make the first tab tightly contact with the inner bottom wall of the bottom housing;

welding the first tab to the inner bottom wall of the bottom housing;

electrically connecting a second tab in the electric core with the conductive member; and removing the butting piece, injecting an electrolyte into the accommodating cavity from a liquid injection port of the conductive member, and after injection of the electrolyte is completed, covering the liquid injection port with a covering member and hermetically connecting the covering member with the conductive member.

17. The manufacturing method of the button cell according to claim 16, wherein before the first tab is welded to the inner bottom wall of the bottom housing, further comprising:

connecting the head cover provided with the conductive member to the bottom housing in a sealed manner; or after the first tab is welded to the inner bottom wall of the bottom housing, further comprising:

connecting the head cover provided with the conductive member to the bottom housing in a sealed manner; or before the head cover and the conductive member are connected together in an insulated and sealed manner, further comprising:

performing a passivation treatment on the head cover and the conductive member.

18. The manufacturing method of the button cell according to claim 16, wherein a step of covering a through hole of a head cover with a conductive member and making the head cover and the conductive member connected together in an insulated and sealed manner comprises:

covering the through hole of the head cover with the conductive member and making the head cover and the conductive member connected together in an insulated and sealed manner by means of heating and pressurization.

19. A manufacturing method of the button cell according to claim 9, comprising the following steps:

connecting a head cover with a conductive member together in an insulated and sealed manner, a through hole of the head cover being covered by the conductive member;

electrically connecting a second tab in an electric core with the conductive member;

placing the electric core electrically connected with the conductive member in an accommodating cavity that is formed by enclosing of a bottom housing and the head cover provided with the conductive member;

connecting the head cover that is provided with the conductive member with the bottom housing in a sealed manner;

welding a first tab in the electric core with the bottom housing; and injecting an electrolyte into the accommodating cavity from a liquid injection port of the conductive member, and after injection of the electrolyte is completed, covering the liquid injection port with a covering member, and connecting the covering member with the conductive member in a sealed manner.

\* \* \* \* \*